(12) United States Patent
Drey

(10) Patent No.: US 12,229,289 B2
(45) Date of Patent: *Feb. 18, 2025

(54) SYSTEM AND METHOD OF CONTROLLING ACCESS TO A DOCUMENT FILE

(71) Applicant: Leonard L. Drey, St. Louis, MO (US)

(72) Inventor: Leonard L. Drey, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,516

(22) Filed: Sep. 27, 2023

(65) Prior Publication Data
US 2024/0126900 A1    Apr. 18, 2024

Related U.S. Application Data

(62) Division of application No. 17/170,580, filed on Feb. 8, 2021, now abandoned.

(51) Int. Cl.
| | |
|---|---|
| *G06F 21/00* | (2013.01) |
| *G06F 16/16* | (2019.01) |
| *G06F 21/60* | (2013.01) |
| *G06F 21/62* | (2013.01) |
| *G06F 40/166* | (2020.01) |

(52) U.S. Cl.
CPC ........ *G06F 21/6209* (2013.01); *G06F 16/162* (2019.01); *G06F 16/168* (2019.01); *G06F 21/602* (2013.01); *G06F 40/166* (2020.01)

(58) Field of Classification Search
None
See application file for complete search history.

(56) References Cited

U.S. PATENT DOCUMENTS

| | | | | |
|---|---|---|---|---|
| 2005/0204008 | A1* | 9/2005 | Shinbrood | H04L 51/08 713/150 |
| 2011/0320400 | A1* | 12/2011 | Namini | G06F 16/27 707/610 |
| 2015/0269331 | A1* | 9/2015 | Bolanos | G06F 21/34 705/51 |

* cited by examiner

*Primary Examiner* — Andrew J Steinle
(74) *Attorney, Agent, or Firm* — IP Strategies

(57) ABSTRACT

A method of controlling access to a document file includes creating the document file, which is an executable file that presents content having at least one media type and is presentable to a user on an electronic device having a processor. A first unique global identifier is associated with the document file. A content storage device associated with a second unique global identifier is provided. The content storage device is coupled for communication with the processor of the electronic device. The document file is then provided to the user providing by storing the document file on the content storage device, but only if the first unique global identifier corresponds to the second unique global identifier in a predetermined manner.

23 Claims, 17 Drawing Sheets

SYSTEM AND METHOD OF CONTROLLING ACCESS TO A DOCUMENT FILE

CROSS-REFERENCE TO RELATED APPLICATIONS

This is a divisional of co-pending U.S. patent application Ser. No. 17/170,580, which was filed on Feb. 8, 2021; which in turn is related to, and claims priority from, U.S. Provisional Application for Patent No. 62/976,224, which was filed on Feb. 13, 2020; which in turn was a continuation-in-part of co-pending U.S. patent application Ser. No. 16/408,556, which was filed on May 10, 2019, which is related to, and claims priority from, U.S. Provisional Application for Patent No. 62/679,374, which was filed on Jun. 1, 2018, U.S. Provisional Application for Patent No. 62/700,659, which was filed on Jul. 19, 2018, and U.S. Provisional Application for Patent No. 62/782,910, which was filed on Dec. 20, 2018; which in turn was a continuation-in-part of U.S. patent application Ser. No. 15/600,501, which was filed on May 19, 2017, which is related to, and claims priority from, U.S. Provisional Application for Patent No. 62/338,816, which was filed on May 19, 2016, U.S. Provisional Application for Patent No. 62/428,673, which was filed on Dec. 1, 2016, and U.S. Provisional Application for Patent No. 62/439,217, which was filed on Dec. 27, 2016; which in turn is a continuation-in-part of U.S. patent application Ser. No. 14/965,855, which is related to, and claims priority from, U.S. Provisional Application for Patent No. 62/090,095, which was filed on Dec. 10, 2014, and U.S. Provisional Application for Patent No. 62/211,112, which was filed on Aug. 28, 2015; which in turn is a continuation-in-part of U.S. patent application Ser. No. 14/524,694, which was filed on Oct. 27, 2014, which is related to, and claims priority from, U.S. Provisional Application for Patent No. 61/895,654, which was filed on Oct. 25, 2013, U.S. Provisional Application for Patent No. 61/904,252, which was filed on Nov. 14, 2013, and U.S., Provisional Application for Patent No. 61/908,383, which was filed on Nov. 25, 2013; the disclosures of all of which are incorporated herein in their entireties.

FIELD OF THE INVENTION

The invention relates to methods of presenting content to a viewer, for example, on a computer display or a dedicated electronic display device. In particular, the invention relates to a system and method of control over access to the content, including modification of the content.

BACKGROUND OF THE INVENTION

Content, and text in particular, is normally presented in a static fashion. That is, when a reader reads text and other content in hard-copy form, text and images do not change, and subtle nuances in the meaning of what the author wishes to convey must be expressed through the careful choice of words and the linear, static emplacement of words and images. If readers want to understand better, they can read the identical content twice. Content provided to a viewer on a computer has the potential to overcome this constraint, but this capability is underutilized. A need exists to enhance the capability of electronic media so that dynamic content can be provided in ways that will transcend the limitations of static, linear expression.

The concept that there could be, inside a published work, any commenting "hidden pages" between original pages of text, viewable by the reader only by choice, is a notion that was so unsuited to—would have seemed unsound in—the old world of paper publishing that probably then it had never been considered, despite the usefulness of the approach.

Recently the capacity for Web-based electronic books and articles to be published in various formats has been proffered by certain electronic publishers. However, a limitation shared by all of these pertains to the publisher's inability to limit dissemination of a document after the sale. Electronic books published by these methods can costlessly be multiplied by buyers, quite easily—even to the extent that some electronic publishers do not guard against the practice.

In a similar way problems are faced especially by corporations and governmental organizations stemming from the evident impossibility of preventing confidential documents—even hundreds or thousands or millions at a time—from being surreptitiously copied to small electronic storage devices by individuals who have had access to these legally at the time but now wish to disseminate them illegitimately. It would be optimal if such documents meant to be circulated to members of a carefully selected "core group" reading list, for instance could be copied only onto one electronic storage device, and then locked onto that device permanently.

And similarly, there may be times when an author or publisher would wish it if certain readers who lack the training to comprehend the work at hand, yet might assume that they did while reading, from being able to access the document easily. The author or publisher might also want to restrict access to the document altogether, or to restrict or condition one or more aspects of access to the document or portions of the document.

Further, sometimes a publisher or an author might find it ideal if a document when being made available online, could be made non-searchable by conventional search engines.

No means has existed to satisfy any of these needs, till now.

BRIEF SUMMARY OF THE INVENTION

The present invention provides a system by which access to a document can be restricted, conditioned, or otherwise controlled. For example, by using the present invention, to a large extent an author can prevent potential readers whom he or she would want not to read a work from reading it. As a non-limiting example, if an author has written something that he feels the average reader because of a lack of training or lack of exposure to relevant life experiences could not understand, no matter what he or she might think while reading it, that author can limit dissemination by preparing an "acceptables" list of email addresses against which requests for the work would be matched by the publishers server before being fulfilled.

Through use of the invention, authors will not be able to block everyone whom they did not wish to read a work from reading it; of course, copies could be borrowed or stolen. But in the authors eyes "the wrong people" will at least not be able to go to the store and buy a copy, click on a link, or have the work drop into their inbox as an unsolicited attachment.

Where the invention is in use as a means of limiting the dissemination of sensitive materials, as for instance in corporations or government agencies, a disgruntled or venal employee will be blocked from easily copying up to millions of confidential documents to a digital storage device such as a simple USB memory stick or a portable hard drive, and then walking away with this in his pocket or bag.

It should be noted that documents published under this invention can be made unsearchable by search engines by containing the contents within strings.

According to an aspect of the invention, a method of governing content presentation includes creating a document file. The document file is a variable computer-readable file that includes content, which is presented to a user in discrete units in controlled sequence on an electronic display device. A unit of content can be defined by the electronic display device as a page or screen. The electronic display device can be a dedicated content reader. Preferably, creating a document file does not include writing programming code.

The content can also include at least one data tag, which can include formatting tags, hyperlink tags, image source tags, sound source tags, video source tags, table tags, form tags, frame tags, style tags, div tags, class tags, embed tags, object elements, JavaScript, Java applets Flash units, and/or HTML5 units.

Presenting the content can include reading the document file using a network interface, such as a Web browser. The document file can be, for example, a plaintext file, an HTML file, and/or an XHTML file. The unviewable content can include advertising content. The document file can incorporate JavaScript.

The document file can include at least a textual portion, in which case at least one delimiter can be inserted at a selected position of the textual portion of the document file, defining delimited content, and predetermined events and/or actions are tracked that occur while the user views units of content. For example, the selected position can be occupied by a particular character combination including the at least one delimiter. When the at least one delimiter is reached as the user views units of content, advancement of content can be stopped until further action is taken by the user or presentation of content can be paused for a selectable, discrete number of time units. Tracking predetermined events and/or actions that occur while the user views units of content can include tracking a number of the delimiters passed by the user while viewing units of content, and/or tracking a number of units of content passed by the user while viewing. The delimiters can include delimiters of more than one type, in which case tracking the delimiters can include separately tracking the delimiters of at least one type. Tracking the number of units of content passed by the user while viewing can include tracking an action by the user causing a subsequent unit of content to be presented, and/or automatically tracking an end of a current presented unit of content for which there is no stop delimiter. The delimiters can be meaningful only if present in the viewable units of content of the current version of the content, if passed by the user after a predetermined action is taken by the user. A monetary charge can be associated with the tracked number of delimiters passed by the user, the tracked number of units of content passed by the user while viewing, and/or movement of an action key, which is an element of an input device in communication with a microprocessor device that is in communication with the electronic display device. For example, a total monetary charge can be increased each time a delimiter is passed by the user and/or each time the number of units of content passed by the user while viewing increases. The unit of content can be a page or screen, coded for by, for example, a string. Tracking a number of units of content passed by the user while viewing can include incrementing a string counter, and the associated monetary charge can increase when the string counter is incremented. The delimiters can include a fee delimiter, in which case the monetary charge is associated with the tracked number of fee delimiters passed by the user. The fee delimiter can be variable in such a way as to make the monetary charge assessed by each fee delimiter variable. The monetary charge and/or a cumulative monetary charge can be multiplied by a user-associated factor. The user-associated factor can be determined at least in part by, for example, performance by the user of a task, such as a task related to questions regarding substance of the content.

According to another aspect of the invention, an integrated device includes a storage medium, a microprocessor device, and an electronic display device. The storage medium includes intransient instructions in a variable computer-readable document file that can be implemented by the microprocessor device to cause content to be presented to a user on the electronic display device according to instructions included in a program file portion of the document file. The instructions in the program file include allowing an author to create variable computer-readable content as a text file portion of the document file, wherein the content is presentable on the electronic display device in controlled sequential, discrete units;

presenting on the electronic display device a current version of the content, in which fewer than all of the units of the contents are viewable by the user, wherein at least some units of unviewable content are disposed prior to the units of viewable content and/or after the units of viewable content;

recognizing when a predetermined action is performed by the user; and in response to recognition of performance of the predetermined action, presenting a subsequent version of the content, such that at least some of the unviewable units of content in the current version of the content are viewable in the subsequent version of the content.

The instructions included in the program file are computer-readable instructions that are largely unvarying and include previously programmed computer code allowing the document file to be executed.

At least some of the content can be, for example, textual content, which can include annotation content. The unit of content can be a page or screen on the electronic display device. The electronic display device can be a dedicated content reader.

According to another aspect of the invention, a method of preventing unauthorized modification of a document file includes creating a document file. The document file is a variable computer-readable file that includes content, which is presentable to a user on an electronic display device. A browser, a portable drive operating system, and/or the document file can be modified, for example, such that the document file includes a designated extension. For example, the modifications can conjointly render the modified document file unable to be duplicated. Modifying the portable drive operating system can include restricting the portable drive operating system such that modified document files on the modified portable drive cannot be opened by other than the modified browser.

The designated extension can render the modified document file unable to be stored except on a modified portable drive, which is a portable drive including the modified portable drive operating system. The modified portable drive can be a first modified portable drive, and the modifications can conjointly render the modified document file able to be moved from an original storage location only if the modified document file is stored on a second modified portable drive. Alternatively, or in addition, the modifications can conjointly render the modified document file able to be moved to a second modified portable drive only if the modified document file is erased from the first modified portable drive, and unable to be moved to a different modified portable drive otherwise.

The modified document file, stored on the modified portable drive, can be altered by a user. The modifications can conjointly render the modified document file having the altered text file portion able to be stored only on the modified portable drive to replace the original text file. The modified document file can be altered by a user by copying only a text file portion of the modified document file using a modified word processor that is configured within the modified browser, altering the copied text file portion of the modified document file using the modified word processor, storing the altered copied text file portion of the modified document file using the modified word processor by replacing the text file portion of the modified document file stored on the modified portable drive by the altered copied text file portion of the modified document file, and using the modified browser conjointly with the modified portable drive operating system to store the altered modified document file. In this case, the browser can be restricted such that it can only open a text file using the modified word processor, and the word processor can be restricted such that it can only store an altered text file to replace the original text file in the original document file on the original portable drive.

In addition, a container ID and an operating executable file can be stored on a portable drive associated with the modified portable drive operating system. A filename can be assigned to the modified document file in which the filename includes a designated filename code. A designated browser code can be assigned to the modified browser. The modified document file can be stored on the portable drive. An operating program associated with the operating executable file can be used to determine if the filename code is valid, based on a predetermined criterion. The operating program associated with the operating executable file can be used to determine if the browser code is valid, based on a predetermined criterion. A condition can be applied such that opening the modified document file in a browser window by the modified browser occurs only if the filename code and the browser code are both determined to be valid, otherwise opening the modified document file is refrained. The container ID can be registered with a publisher, and storage of the modified document file on any portable drive having an unregistered container ID can be prevented.

The method can also include creating an executable file including the modified document file at a first device. The executable file can be transferred from the first device to a receiving device, which is the first device or a second device. The modified document file can be opened from the executable file only if the receiving device is communicatively connected to a portable drive having a registered container ID; in this case, the modified document file is stored on a portable drive having a registered container ID. Opening the modified document file if the receiving device is not communicatively connected to a portable drive having a registered container ID can be prevented. Transferring the executable file from the first device to a receiving device can include emailing the executable file.

An electronic document according to the invention can be distributed by the publisher as an email attachment. In an exemplary implementation of the invention, when a modified "registered" portable drive is connected via a USB port of the computer (registration determined by the system software of the modified Web browser, by checking the container ID of the portable drive) and its contents stored on the computer, there is a modified Web browser having software that bears a suitable alphanumeric code—the appropriateness of the alphanumeric code determined by the operating system of the modified portable drive. As a measure to prevent unauthorized duplication of the document by the user, the registered portable drive to be employed by the user to initially store the document can be constrained by the publisher to be a particular registered portable drive inserted by the user into an accessory drive in the user's computing device at the time of the document's acquisition. The system software of the modified Web browser, or in an alternate implementation the operating system of the modified portable drive, will cause an operating executable file to be extracted from the email attachment and stored directly to the modified portable drive. During extraction and storage, the operating executable file will be assigned a filename embracing an alphanumeric code recognizable by the portable drive operating system and the system software of the modified Web browser as corresponding to the particular modified registered portable drive.

Thereafter, the operating executable file, stored only in a single location—on the particular modified registered portable drive to which it had originally been stored at the time of extraction of the email attachment representing the original electronic document—will not be openable or operable except by a modified Web browser, whether this browser is housed on the original computer or some other suitable electronic device. The operating executable file corresponding to the original electronic document cannot be read and the text-file source code cannot be viewed or modified, and then after modification if any, cannot again be stored except from and to the original modified registered portable drive.

Thus in general terms, removal of the operating executable file from the particular modified registered portable drive to which it had originally been stored will not be permitted by the system software of the modified browser. If alteration of the text-file of the original operating executable file by a user occurs, storage of the resulting altered operating executable file will not be permitted anywhere except to the original modified registered portable drive. Likewise, duplication of the operating executable file on the original modified registered portable drive or to another such modified registered portable drive, or to any other electronic device, will not be permitted by the Web browser modified according to the invention.

According to another aspect of the invention, a system of controlling access to a document file includes a content management system, a dedicated user interface application, and a storage device. The user interface application, such as a browser, runs on the user's computer or other processing device, and presents the content to the user subject to an encryption scheme enforced by the content management system. The content is stored on the storage device, which can be a portable storage device such as a thumb drive, or an internal hard drive. The content can also be stored on a device at a server and made available via network connection, or can be stored on a physical storage medium such as a compact disk, which can be read at the processor by an appropriate reader. The storage device, medium, or reader has associated with it a globally unique identifier, such as a serial number, that is not discernable through physical inspection or routine reading of the output of the device, medium, or reader. This device is registered with the content management system by its identifier.

The method includes creating a document file. The document file is a mutable computer-readable file that includes the content, which is presentable to a user on an electronic display device. The document file is then encrypted, according to a scheme administered by the content management system. The encryption scheme incorporates the globally unique identifier and an encryption key, which are applied as inputs to an encryption algorithm according to the scheme when encrypting the file. Thus, to access the unencrypted file, a decryption scheme must be incorporated that applies both an identifier associated with the globally unique identifier and a decryption key associated with the encryption key to a decryption algorithm corresponding to the encryption algorithm. The decryption key can be, for example, embedded in the user interface application such that accessing the decrypted file through the use of another interface or browser is not possible. In this way, the content management system controls access to the document file and therefore the content.

Access restrictions to the file enforced by the encryption can, for example, render the document file unable to be duplicated. Further, the content management system can restrict storage of the document file to the device or medium associated with the globally unique identifier, and even then preferably only if the document file is first encrypted. For example, if the document file is first made available to a user in encrypted form on a portable storage device, the user would be able to view the unencrypted document only if the processing device has an ID associated with the globally unique identifier of that portable storage device, using the user interface application embedded with a proper decryption key. The document file would be stored temporarily on the user's processing device while being viewed, but preferably would only be savable back to the portable storage device having the globally unique identifier, and only in encrypted form. Preferably, the document file would be erased permanently from the users processing system when encrypted and saved back to the portable storage device. For example, erasing of the document file can be made automatic as part of the encryption or saving processes.

In some cases, the content management system can allow storage of the document file from the user's processing device to a different storage device or medium. In such a case, the document file would be first be encrypted using an ID associated with the globally unique identifier of the different storage device or medium. Preferably, the encrypted document file would not be stored to the different storage device or medium unless it is also permanently erased from the original storage device and the user's processing device.

If authorized by the publisher, the content of the document file can be altered by a user. Preferably, the content management system will render the modified document file having the altered content able to be stored only on the storage device or medium having the globally unique identifier, to replace the original document file. The modified document file can be altered by a user by copying the content of the modified document file using a content editor that is configured within the modified user interface application, altering the copied content of the modified document file using the content editor, storing the altered copied content of the modified document file using the content editor by replacing the content of the modified document file stored on the authorized storage device or medium by the altered copied content of the modified document file, and using the user interface conjointly with the storage device or medium to store the altered modified document file. In this case, the user interface can be configured such that it can only open content using the embedded content editor, and the content editor can be restricted such that it can only store altered content to replace the original content in the original document file on the storage device or medium. These restrictions are all enforced by the content management system through the use of encryption as described above.

The method can also include creating an executable file including the modified document file at a first device. The executable file can be transferred from the first device to a receiving device, which is the first device or a second device. The modified document file can be opened from the executable file only if the receiving device is communicatively connected to a storage device having a registered globally unique identifier; in this case, the modified document file is stored on a storage device having a registered globally unique identifier. Opening the modified document file if the receiving device is not communicatively connected to a storage device having a registered globally unique identifier can be prevented by the content management system by enforcing this policy through encryption. Transferring the executable file from the first device to a receiving device can include emailing the executable file, for example, or any other file transfer mechanism, such as http download.

An electronic document according to the invention can be distributed by the publisher, for example, as an email attachment. In an exemplary implementation of the invention, when a "registered" portable storage device is connected via a USB port of the computer (or other port or interface)—this, determined by the system software of the user interface application, by checking the globally unique identifier of the storage device—and is contents stored on the computer, there is a user interface application having software that bears a suitable alphanumeric code—the appropriateness of the alphanumeric code determined by the storage device. The system software of the user interface application, or in an alternative implementation software resident on the storage device, will cause an operating executable file to be extracted from the email attachment and stored directly to the storage device. During extraction and storage, the operating executable file will be assigned a filename embracing an alphanumeric code recognizable by the storage device software and the user interface application as corresponding to the particular registered storage device.

Thereafter, the operating executable file, stored only in a single location—on the particular registered storage device to which it had originally been stored at the time of extraction of the email attachment representing the original electronic document—will not be openable or operable except by the user interface application associated with the content management system, whether this user interface is housed on the original computer or some other suitable electronic device. The operating executable file corresponding to the original electronic document cannot be read and the content file source code cannot be viewed or modified, and then after modification if any, cannot again be stored except from and to the original registered storage device.

Thus in general terms, removal of the operating executable file from the particular registered storage device to which it had originally been stored will not be permitted by the user interface application. If alteration of the content file of the original operating executable file by a user occurs, storage of the resulting altered operating executable file will not be permitted anywhere except to the original registered storage device. Likewise, duplication of the operating executable file on the original registered storage device or to another such registered storage device, or to any other electronic device, will not be permitted by the user interface application according to the invention.

The system and method of the present invention uses encryption techniques to control access to a document file that includes content. Encryption is used to enforce the access controls and to ensure the integrity of transactions between the publisher and users. As described, the invention utilizes encryption and decryption algorithms and keys to implement the cryptographic techniques. It is contemplated that any type of symmetric or asymmetric encryption scheme known or devisable to those of skill in the art would be applicable to the invention, and although specific examples of cryptographic schemes might be disclosed, it is not intended that the invention be limited to any such scheme or implementation.

According to an aspect of the invention, a method of controlling access to a document file includes creating a document file. The document file is a mutable computer-readable file that includes content, which is presentable to a user on an electronic display device. The document file is encrypted, and the encrypted document file is provided to a user. This includes storing the encrypted document file on a content storage device that is associated with a unique global identifier as designated by the publisher, for example, a thumb drive having a unique serial number or container ID. Encrypting the document file includes applying an encryption algorithm to the document file to reversibly encipher the document file. Applying the encryption algorithm to the document file includes providing an encryption key and the unique global identifier and actuating the encryption algorithm with the encryption key and the unique global identifier. Thus, the encrypted document file will be enciphered in a way that links it to the identifier of the content storage device and to the encryption key, which preferably is managed by the publisher.

To access the document file, the user can open a user interface application or browser on a processing device. The content storage device can be coupled for communication with the processing device, By way of the user interface application, the user can select the encrypted document file for access. The user interface application can then decrypt the encrypted document file, and the content included in the decrypted document file is then presented to the user on the electronic display device, within the user interface application. Decrypting the encrypted document file includes applying a decryption algorithm associated with the encryption algorithm to the encrypted document file to decipher the encrypted document file. Applying the decryption algorithm to the encrypted document file includes providing a decryption key associated with the encryption key, and the unique global identifier, and actuating the decryption algorithm with the decryption key and the unique global identifier, Thus, the document file can only be accessed, and the content viewed, if a key corresponding to the encryption key is available, and also if the unique global identifier is available, and if the appropriate decryption algorithm is used.

Preferably, the decryption algorithm is embedded within the user interface application. Thus, the algorithm is applied only through use of the interface. Likewise, the unique global identifier to be applied to the decryption algorithm is stored in a processor storage device accessible by the user interface application, preferably only be the user interface application. The identifier can be provided to the user with the interface download, thereby linking the particular interface software provided to the user with the global identifier for the content storage device to be used by the user. To protect against compromise of the identifier, it can be encrypted prior to storing the unique global identifier in the processor storage device, and the user interface application can decrypt the encrypted unique global identifier prior to decrypting the encrypted document file.

Likewise, the decryption key can be stored in a processor storage device accessible by the user interface application. The decryption key can also be encrypted prior to storing the decryption key in the processor storage device. The user interface application can then decrypt the encrypted decryption key prior to decrypting the encrypted document file.

The decrypted document file is configured to be opened only within the user interface application. Because the components necessary to decrypt the encrypted document file are embedded within or only accessible by the user interface, the encrypted document file can only be decrypted and content presented to the user through use of the user interface. Once opened, other access controls can be implemented by the interface application to designate what can be done with the decrypted document file.

For example, the user interface application can be configured to control access to the decrypted document file by preventing duplication of the decrypted document file. This access control, like any other access control implemented by the interface, can be fixed or can be made conditional or limited. For example, a particular user could attain a status, through payment or otherwise, that would allow the user to make duplicate copies of the document file, or a limited number of such copies.

Preferably, the user interface application controls access to the decrypted document file by preventing storage of the decrypted document file other than on the content storage device having the unique global identifier. Thus, the user would receive the document file on the designated storage device and would only be able to save the document file back to the same storage device. Preferably, the document file would be encrypted by the user interface application prior storage on the content storage device.

As another example, the user interface application can control access to the decrypted document file by preventing modification of the decrypted document file by the user, Again, this control could be made fixed, or could be conditional or limited, in which case controlling access to the decrypted document file includes allowing, by the user interface application, modification of the decrypted document file by the user. If modification is allowed, the decrypted document file is loaded into temporary storage in the processing device and only a text file portion of the decrypted document file is copied using a text editor that is configured within the user interface application. The copied text file portion of the decrypted document file is then modified using the text editor and the modified copied text file portion of the decrypted document file is stored by replacing the text file portion of the decrypted document file stored in the temporary storage by the modified copied text file portion of the modified document file.

When the decrypted document file is to be presented to the user on the electronic display device, the decrypted document file is loaded into temporary storage in the processing device. To be sure that content can't be viewed by the user and also be available on the content storage device, the user interface application erases the document file from the content storage device when loading the decrypted document file into temporary storage in the processing device, and erases the document file from the temporary storage when transferring the document file to the content storage device.

However, content can be stored on a different content storage device than the device that was first provided to the user, under certain circumstances. In this way, for example, content can be provided to the user on a first thumb drive, and later stored to a second thumb drive. It is preferable, however, that only one instance of the document file exist in the possession of the user.

In this case, the content storage device is a first content storage device and the unique global identifier is a first unique global identifier. A second content storage device is coupled for communication with the processing device, the second content storage device being associated with a second unique global identifier. The processor storage device is checked for the second unique global identifier, and the document file is stored on the second content storage device only if the second unique global identifier is stored in the processor storage device. The user interface application erases the document file from the temporary storage when transferring the document file to the second content storage device.

The document file can be an executable file. Providing the encrypted document file to the user can include emailing the executable file to the user.

The method of the invention provides access control of any type over a digital asset that is provided to a user, enforced by encryption. Access control can be applied to different types of access individually or in combination, and can follow the document or be specific to the user. Access permissions can be conditional and can apply to an entire document file or to only portions of the file.

According to an aspect of the invention, a method of controlling access to a document file includes creating the document file, which is an executable file that presents content having at least one media type and is presentable to a user on an electronic device having a processor. A first unique global identifier is associated with the document file. A content storage device associated with a second unique global identifier is provided. The content storage device is coupled for communication with the processor of the electronic device. The document file is then provided to the user providing by storing the document file on the content storage device, but only if the first unique global identifier corresponds to the second unique global identifier in a predetermined manner. This correspondence can be, for example, identity; that is, if desired it can be required that the document file and the content storage have the same unique global identifier. Alternatively, the publisher can specify a mapped correspondence or some other form of correspondence between the first and second unique global identifiers.

According to another aspect of the invention, a method of controlling access to a document file includes creating the document file, which is a processor-readable file that includes content having at least one media type and is presentable to a user on an electronic device having a processor. The document file is encrypted, and the encrypted document file is provided to the user by making the encrypted document file available to be stored on a content storage device configured to interface for communication with the processor. The content storage device is associated with a unique global identifier and is arranged internal to the electronic device or external to the electronic device, Encrypting the document file includes applying an encryption algorithm to the document file to reversibly encipher the document file. Applying the encryption algorithm to the document file includes providing an encryption key and the unique global identifier and actuating the encryption algorithm with the encryption key and the unique global identifier.

The method can also include opening, by the user, a user interface application, on the electronic device. The content storage device is coupled for communication with the processing device, and the encrypted document file is selected for access by the user via the user interface application. The encrypted document file is then decrypted by the user interface application, and at least some of the content included in the decrypted document file is presented to the user on the electronic device, within the user interface application. Decrypting the encrypted document file includes applying a decryption algorithm associated with the encryption algorithm to the encrypted document file to decipher the encrypted document file. Applying the decryption algorithm to the encrypted document file includes providing a decryption key associated with the encryption key, and a user value associated with the unique global identifier, and actuating the decryption algorithm with the decryption key and the user value. Presenting at least some of the content included in the decrypted document file to the user on the electronic device can includes establishing at least one condition to be satisfied by the user, and presenting an amount of the content to the user corresponding to the at least one condition satisfied by the user. The at least one condition can relate, for example, to payment by the user, or to consumption of the content by the user. The decrypted document file can be configured to be opened only within the user interface application.

The method can also include controlling, by the user interface application, access to the decrypted document file. This control can include selectively allowing and preventing, by the user interface application, duplication of the decrypted document file.

Controlling access to the decrypted document file by the user interface application can include selectively allowing and preventing, by the user interface application, modification of the decrypted document file by the user. For example, modification of the decrypted document file by a user can include loading the decrypted document file into temporary storage in the electronic device, copying a content portion of the decrypted document file using a content editor that is configured within the user interface application, modifying the copied content portion of the decrypted document file using the content editor, and storing the modified copied content portion of the decrypted document file using the content editor by replacing the content portion of the decrypted document file stored in the temporary storage by the modified copied content portion of the modified document file.

Controlling, by the user interface application, access to the decrypted document file can include preventing, by the user interface application, storage of the modified document file other than on the content storage device having the unique global identifier.

The method can include copying content from a registered storage device to another storage device, but only if the storage device to which the content is being copied is also a registered storage device.

Copying content from a first to a second registered storage device preferably will occur by the network interface application's determining that a second registered drive is present in a peripheral slot, by copying and deleting the decrypted document file from temporary storage, by re-encrypting the file, and by storing the re-encrypted version on the second device. As the executable's title, the network interface application will use an alphanumeric code which is correct with respect to the second device.

Controlling access to the decrypted document by the user interface application file can include selectively allowing and preventing functions of the user interface application associated with the decrypted document file.

The document file can include an executable file. Providing the encrypted document file to the user can include emailing the executable file to the user as an email attachment. The method can also include assigning a unique alphanumeric identifier to the document file, and assigning the unique alphanumeric identifier to the email attachment.

The method can also include determining whether the content storage device is coupled for communication with the electronic device, and prior to dissemination of the email attachment, modification to encompass the unique alphanumeric identifier of the storage device.

The method can also include assigning a binary-valued variable to the executable file and setting the binary-valued variable to a first value when the executable file is first provided to the user. The binary-valued variable is set to second value when the executable file is copied to a storage device other than the content storage device associated with the unique global identifier, including temporary storage in a computing device. Copying of the executable file is then controlled by checking the value of the binary-valued variable, allowing copying if the value of the binary-valued variable is the first value, and prohibiting copying if the value of the binary-valued variable is the second value. The method can also include setting the binary-valued variable to the first value when the user interface application is closed by the user with erasure of the document file from temporary storage. If the user pays a fee associated with access to the document file while the content storage device is coupled for communication with the processing device, the binary-valued variable is set to the first value.

According to another aspect of the invention, a content management system includes system memory storing instructions that, when executed by a processor implement the inventive method.

According to an exemplary preferred implementation of the invention, the following sequence occurs:

1. At the time of acquisition of a document from the publisher, a registered drive must be present in a peripheral slot, coupled for communication with the user's computing device.
2. The purchased executable file of the document will only now be formed by the publisher, later to be disseminated as an email attachment. The publisher will assign to the .exe file an identifying alphanumeric algorithmically corresponding to the unique global identifier of the registered storage device, as "learned" by the publisher in the previous step.
3. For the user to be allowed to download the email attachment, his computing device must have the designated storage device in a peripheral slot or otherwise coupled for communication with the computing device; also, the storage device's unique global identifier must correspond with the identifying alphanumeric assigned to the executable file.
4. Before the executable file can be decrypted and opened from the storage device by the user interface, the interface must confirm that the storage device is "registered" and confirm that its unique global identifier corresponds with the alphanumeric of the executable file.
5. If both conditions are met, the .exe is copied and the document file decrypted and stored in RAM.
6. A value of a binary variable in the .exe simultaneously is changed to block "current re-use" of the .exe. The value of this variable will revert when the user interface is closed.
7. If the user wants to move the .exe file to a different registered drive, he can do so with the document open in the user interface—in lieu of closing the interface. Or he can move the executable directly to another registered drive.
8. In either case, the original copy of the .exe file be "blocked" by the binary variable. On the new drive, the document file will be re-encrypted and stored with a name corresponding to the unique global identifier of the new drive.
9. The user can reactivate a "blocked".exe by paying for a second copy. The blocking variable will revert.

BRIEF DESCRIPTION OF THE DRAWINGS

FIG. 6 is a flow diagram of an exemplary query process of the invention.

DETAILED DESCRIPTION OF THE INVENTION

Figure 1:
FIG. 1 is a block diagram of an exemplary document file.

The present invention provides a system by which a publisher and/or an author can create a document, control access to that document by a user, and control presentation of the document content to the user once accessed. Particulars of document creation and presentation are described briefly herein, and these aspects of the invention incorporate details more fully described in the documents listed above, the disclosures of which are also incorporated herein by reference above, Aspects of the invention related to access control apply to documents created according to the invention, but are not limited in applicability to such documents.

The access control features described herein are contemplated for use with any digital asset without restriction.

Further, such a digital asset can include any form of content, including text, sound (such as a music file), still image (such as a photographic image), or moving or animated image (such as a movie file), alone or in combination as part of a multimedia file. For simplicity of discussion, such digital assets are referred to herein as document files, which term shall encompass any type of mono-media or multimedia file.

The present invention provides a way to present a document consisting of text characters and/or other content to a viewer, such as a computer user, in multiple versions which can be temporally sequenced according to the depression of one or more predetermined control or action keys as specified by the author of the document being viewed. For example, according to the invention, a document can include words, letters, numerals, symbols, blocks of color, digital photographs, graphical images, movies, sound, any other visual and/or audio binary file, forms or interactive forms, structured data, markup language data, links, and Web pages, which can be presented on a viewer's display sequentially as two or more versions, both of these or all of these cant oiled by the reader using an action key or keys, the second and/or later versions being brought before the viewer only once he or she has struck the pertinent action key.

In a broad embodiment of the invention, after a designated action by the user, the initial version of the document is replaced by the second version, which may include more, different, or otherwise less material than the original document. For example, the initial version can be replaced with a second version that is identical to the initial version with the exception that it includes additional text on or following some or all of the pages of the initial version. Per a decision made by the author or editor, an indefinite number of subsequent versions can be presented, each differing in some manner from the one previous to it. Thus, a one-page document can be replaced, for example, by a similar document having as a second page, the first page now with certain annotations. Or otherwise, a "logically complete" single-page document can be supplemented by one or more additional pages that are subordinate to or otherwise related to it. A document can continue to be expanded through the presentation of subsequent versions, serially. The initial version can include, constitute, or encompass typed or hand-written notes, an author's outline, précis, or summary, or any other preliminary aspect of the writing process that then will be developed through the presentation of subsequent versions into a progressively more complex and/or complete work of description, narration, and/or explication.

It can also be the case that notes, an outline, and/or other preliminary aspects of the writing process can follow a complete work, or be placed within it at an intermediate point or some intermediate points.

An electronic document, after having been published, can be modified by the author or editors, for instance, to discuss continuing developments in a news cycle or in a course of scientific discovery, to embrace readers' comments including criticisms of the initial document, or simply to air the author's or editors' further reflections on the subject matter after some passage of time. Such additional material can be folded into the initial version in the form of additions to and annotations on the original pages, or can be made up into a more complex and refined, separate, new serial version.

Versions of the document can differ by the presence of "interleaves" disposed in a second and any subsequent versions of the document as presented to the user, each version of the document file being sequentially read by a microprocessor device according to instructions contained in the program file and subordinately, the text file. If for example there are two versions of a document, the first version will bypass all of the interleaves and only the second version present the interleaves in their proper order. Or the interleaves can be present in the first version, or second or further versions, but not viewable until activation of a particular action key by the user; or otherwise, interleaves pertaining to the first version, or second or further versions, can be present elsewhere than within the respective version and not viewable except with activation of a particular action key by the viewer, with activation of the same or different action key required to return the viewer to the respective version. In other words, the electronic publication will have multiple interleaves hidden between designated pages or sections of the document, or after or before the document, as the document is originally presented to a viewer. These interleaves normally will be hidden from the reader so by the document's author's design, the viewer will not see them the first time reading through the book. Then, after a predetermined action, such as actuation of a predetermined key by the viewer, the second version of the content is presented to the viewer. The second version includes interleaved content that was not available to the viewer when accessing the first version. The possibility that the reader will summon the interleaves other than at the point or points intended by the author can be prevented by constraining the definition of the action key so that the activation of the key by the reader will have one or more different effects or no effect depending on the page viewed by the reader at the time of the activation of the key.

Thus, according to the invention, the author or a commentator can provide interleaved material that complements or comments on the original material. For example, the interleaved content can include notes by the author of the original work, scholarly comments and interpretations by others, and historical and geographical facts related to passages in the content provided. Material in interleaves may be written by the author, editors, or later commentators, and interleaved material may qualify or advance the initially presented material.

To implement the method of the invention, text is written by an author/programmer so as to be read by a reader's computer, or other microprocessor-driven device, as computer code. This code can be, for example, similar to or no different from ordinary HTML code, yet the method of the invention provides several advantages. The code includes delimiters that the author can use when writing/coding that will stop or delay presentation of content to the viewer, charge viewers a variable amount as that point in the document is passed, or return to the beginning of the document. These delimiters can be combined.

In a preferred embodiment, the text or other content is authored such that text, or the ordinary language of HTML or XHTML or another compatible language for the Web, is augmented with new delimiters. The text is coded by the author in "strings" that include the delimiters, wherein each string presents a new screen of text. According to the invention, all formatting features of HTML can be used. Retaining the broad feature set capability of HTML provides great advantages to the author.

Annotations can also be made to appear or go away at the stroke of an action key. For example, these notes can appear in indented and highlighted boxes, or in any other format of the author's choosing, once the interleaves are enabled. Highlighting or other emphasis of text can also arise, timed to appear automatically according to the author's specification or on depression of the action key by the viewer.

HTML documents can be made to appear as advertisements that appear on the viewer's screen, one by one, either in a timed, automatic sequence in the currently viewed version of the document, or at the control of the viewer, either in the currently viewed version of the document or in a second or subsequent version. For boxes or pages to appear in an automatic timed sequence within or as a complete individual string that makes up a non-interleaf page, a delay delimiter can be inserted.

According to an exemplary general process of the invention, the author creates a document file by authoring content that preferably includes text. Predetermined portions of the text are delimited in order to define delimited content. The document file is then read by a microprocessor device and displayed to a viewer, and the delimited content is displayed differently than other portions of the content of the document file according to the nature of the delimiters chosen by the author/programmer. The coding of the delimiters can be made transparent to the author, because this coding is concealed in the document file within the program file, separately from the text file and in a way that the author is not expected to modify, or need to modify. Therefore, computer programming skills are not needed at the time of authoring or formatting of an article or book. For example, an author may apply any delimiters of his or her choosing through utilizing the same word processing program he or she uses to author ordinary static-text documents. Regardless of location, delimiters will "drop out" in the sense that although they will have meaning to the microprocessor running the conjoint document and program files, the viewer will never see the characters or the spaces of the delimiters on his or her screen.

The document file need not only include text, and instead can be a multimedia file including still and moving images and sound as content, any portion of which can be delimited. Further, HTML files and XHTML files can be document files that are authored according to the invention, and any section of such a document can be delimited for controlled presentation to a viewer.

As part of the authoring process, the author defines delimited content in the document file as the text file component of the document file is first authored, or later, in a separate delimiting action. The viewer will display the document on a microprocessor device such as a computer or dedicated document reader, which will identify the delimited content and present it to the viewer as specified by the author. If the computer or other viewing device is connected to a network, a conjoint text and program file can be stored on a server or in a location at which it can be accessed by a server, and a network interface program can be used to view the document file. Or alternately, the text file and the program file can be stored in separate locations, particularly if the program file does not need to be altered to run a certain text file. For example, a Web browser running on a notebook computer with a wireless Internet connection can be used to view the document file through reference to the program file, where the conjoined text and program files can be accessed via the reader's typing in the Web address of the conjoined document (the text file as this is embedded within the program file) in a browser task bar.

The authoring process can include delimiting the content such that further action is required by the viewer to access the second version of the document file. As previously discussed, this action can include the use of an action key. The viewer will be able to display a portion of the complete document file, but subsequent viewing of currently unviewable content will require additional action as specified by the author.

Thus, the authoring process includes creating content and delimiting it so that presentation of content is controlled either automatically or by the viewer through activating an action key. The capability to author a document in this manner can be provided by any word processing program. This document, now in the sense of a "document file," can be stored on a medium such as a portable memory device or a hard drive internal to a computer, or as instructions resident temporarily in RAM. The stored instructions can be implemented by a microprocessor device through reference to an unchanging or modestly modifiable program file, which will be combined with the text file or will be stored separately and cause a document to be displayed on an electronic device. Although in the exemplary implementation of the invention, the text file will be written in ordinary HTML or XHTML code, the program file preferably will be written in JavaScript. Multi-page documents including interleaves will be presented as collections of single web pages in an ordinary web browser. Text file code can be accessible to viewers if desired by the publisher, allowing users to modify their copy of the text file in the sense of adding their comments to their own copies, for instance.

Text for presentation according to the invention can be created by modifying previously-authored plain-text documents. Such plain-text documents are divided into strings, each string representing a single page or other predefined unit. Strings are marked up in a markup language, such as HTML, and delimiters are added. The resulting text file is inserted into the program, to be acted on by a program file that is also present in the document file.

It is also contemplated that the invention can be embodied as an integrated device that includes the storage medium described above, as well as a microprocessor device and an electronic display device. The integrated device can include an action key in communication with the microprocessor device for initiating viewer action.

Although the invention has been described to this point in terms of viewing versions of a complete document, it is contemplated that a document can be divided, such as into chapters, and that the chapters or other components can be serialized individually, in order or otherwise, each component having one or more interleaved versions that can be presented to a viewer. For example, a sequence of strings, each representing an individual page in the document, can be indefinitely long and can resemble a magazine, newspaper, or book, with any number of pages and any number of articles or chapters. Non-sequential access features, can also be provided through modification of the program file. Tables of contents at any point in a document can comprise simple lists, or they can be geometrically more complex shapes, including graphics, digital photographs, and text, created, for example, using HTML's "table" or Cascading Style Sheets "DIV" functions, "Advertisement boxes," possibly hyperlinked to Web pages and possibly authored according to the method of this invention, can also appear on table of contents pages, or anywhere else in the document, including between pages of otherwise-continuous narrative text.

In tables of contents or at other "points of departure" in a document, items can be hyperlinked and/or can anticipate possible "infralinking" by the user—the latter term referring to the activation of an action key to shift the viewing frame to a different page or to a different unit of content within the document. To permit infralinking, the action key to be activated can be indicated as a superscript beside a particular term or the end of a sentence, for example.

Off-line viewing of documents can also be permitted, with content consumption and associated charges determined only when the viewer next logs on to the content-provider's Web site. While off-line, through attending to their fee total, viewers can limit their consumption to remain within a preferred tolerance.

Thus, according to the invention, the author of a document can control the manner in which it is displayed to a reader. For example, an incomplete version, followed by a more complete version, followed by still more complete versions, some or all of which might be annotated, can be provided to the viewer in sequence, through the use of interleaved content. Also, fee delimiters can be included within the interleaved pages and ordinary pages of a document in order that a publisher, author or editor, or later commenter can levy appropriate fees of viewers commensurate with their consumption of the document.

The present invention includes the method as described above. Within the scope of the invention, the method can be implemented as a computer program that can run on a computer or any device having a processor, including a dedicated reading device. The program can be loaded onto the computer directly, or can be implemented over the Internet or any other network. The invention can also be embodied as a non-transient storage medium on which are stored instructions that can be interpreted by a processor to cause a computer or other device to perform actions according to the described method, as described above.

The invention can also be embodied as a computer or other device on which the method is performed. For example, a general-purpose computer, including a processor, memory, one or more input devices, and a display of some sort, set up to view text as described herein, or set up on a network or as a stand-alone device and receiving documents authored according to the invention, is contemplated as falling within the scope of the invention. A special-purpose device dedicated to reading documents authored according to the invention is likewise contemplated. For example, document files can be loaded onto and stored on a portable memory medium that can be attached to and read by such a special-purpose device, or document files can be downloaded onto such device via a network or directly from another computer or other electronic device. Such a special-purpose "reader" will preferably be portable and will present documents to a viewer, Such a device can be functionally simple, including a display, action keys, and a pointing device that can move a cursor to navigate the table of contents of a document being read. For example, a portable console having a suitable display can be provided with a touchpad pointing device and buttons, advantageously located for manipulation by a reader.

Thus, it is apparent that the invention provides a number of advantages over static text as it is presented in printed books and magazines and in "eBooks."

The following is a non-limiting example of content provided to a viewer according to the invention. A document is provided to a user as a JavaScript and HTML file, preferably as an email attachment or as a direct download either to a portable device such as a laptop, smartphone, or tablet computer, or to a non-portable electronic device such as a desktop computer. Once the file is opened in a Web browser, it is presented to the viewer as a series of pages, which each can contain any combination of text and media content. Each page can be sized to be viewed on a single screen of the viewer's device, or can be scrollable. If according to author's wishes, during presentation of a document the current page does not automatically progress to the next page, then when the viewer has finished consuming the content on a current page, he or she actuates a predetermined key to move on to the next page. In a preferred implementation, pressing the Enter key (hereinafter, "the main action key") on a viewer's computer keyboard or dedicated reader keypad can advance the content to the next unviewed non-interleaf page of the currently viewable unit of content; pressing the "N" key can advance the viewing frame by "1+(the number of interleaves between non-interleaved pages in the document)," and pressing the "J" key can advance the viewing frame by 1, regardless of whether the current page is a non-interleaf or an interleaf page, for instance. Also, if the first string of the document is chosen by the author as the target, the numeral "1" on the computer keyboard can be programmed to reset the string counter to 0, thus returning the viewer to the first page, the utilization of other page-targets necessitating the resetting of the string counter to other numerals, of course.

According to the invention, it is possible that the next page will deviate only infinitesimally from the prior one, for example only in the coloring or font style, bolding, italicization, underlining, or highlighting of a single word, or can deviate more markedly from it, through, for example, the addition of a commenting text box or boxes; or the two pages can be entirely different from each another, or can be no different from one another whatsoever. Progression from the current page to the next page can be "in register." Progression from the current page to the next page will always be instantaneous, except when the main action key ("Enter") is used to advance the page.

Figure 2:
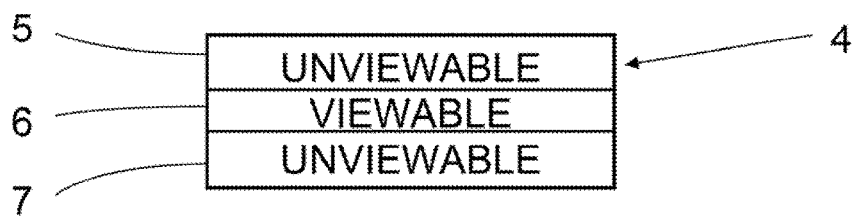
FIG. 2 is a block diagram of an exemplary embodiment of content.
Figure 3:
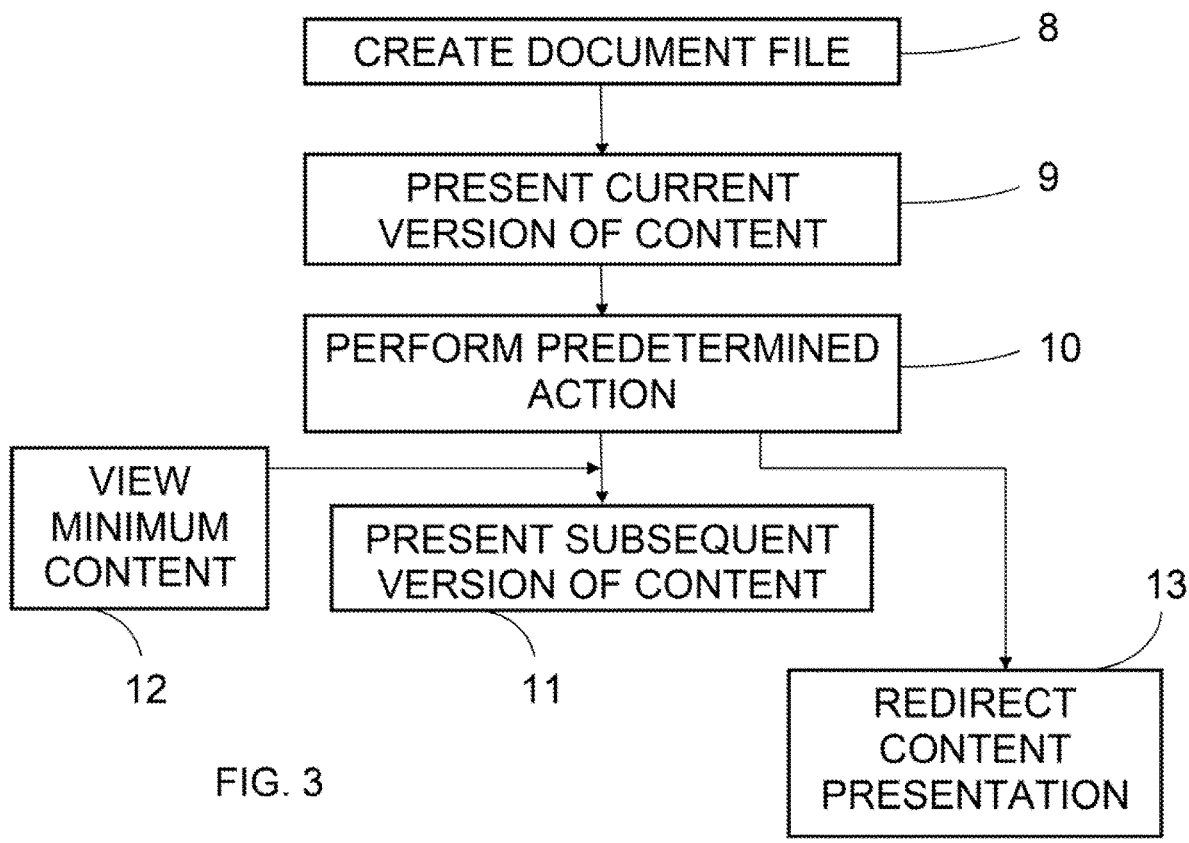
FIG. 3 is a flow diagram that shows an exemplary general process of the invention.

As shown in FIG. 3, such a method includes creating a document file 8, which includes a text file portion 2 and a program file portion 3 (FIG. 1). The document file is a variable computer-readable file that includes content. When the document file is opened, the content is presented to a user on an electronic display device, in discrete units according to a controlled sequence. As shown in FIG. 2, the content includes viewable content 6 and unviewable content 5, 7. In the example shown, some unviewable content precedes the viewable content 6 in sequence, whereas other unviewable content 7 follows the viewable content in sequence, although the sequencing of viewable and unviewable content units can be configured any manner according to the invention, as is apparent to one of skill in the art.

According to the exemplary embodiment shown, a current version of the content is presented 9. In this current version, fewer than all of the units of the content are viewable by the user, that is, only currently viewable units of content are viewable by the user. The unviewable units of content preceding and following the viewable units of content cannot be seen by the user when the current version of the content is being viewed. The user views the viewable units of content, which can advance unit-by-unit through a predetermined sequence, either automatically or by action of the user.

At some point, a subsequent version of the content can be presented to the user, again either automatically or by action of the user 11, According to this exemplary embodiment, the user performs a predetermined action 10, in response to which the subsequent version of the content is presented 11. The subsequent version of the content varies from the current version in some respect. In this example, at least some of the units of content that were unviewable in the current version of the content can be viewable in the subsequent version of the content. This subsequent version of the content might be the final version, or further subsequent versions of the content can be presented to the user in this manner, each of which can vary from the previously-viewed version in some respect. The previously-unviewable content can be additional text, such as explanatory text or text that is revealing in some way and that completes or extends the content that was previously viewed. Alternatively, the previously-unviewable content can be annotation content, commentary, bibliographical information, advertising content, or any other content that is subsequently added to the current content, as part of one or more subsequent versions. Again alternatively, the previously-unviewable units of content can be an identical version of the currently viewable version—this done to enable the user to modify the original version while maintaining an unmodified copy of it, intact. The two versions can be "toggled between" by a user by employing a pair of special action keys defined within the program file.

Thus, the user reads the current version of the content until such time as he or she chooses to be presented with the subsequent, different version of the content, in this case when the predetermined action is performed by the user. In response to performance of the predetermined action, presentation of the content can also be redirected to a different unit of content 13. For example, presentation of the content can be returned to a previous unit of the content, such as the first unit of content viewed by the user. Alternatively, the different unit of content can be a unit of content that was previously unviewable, such as content prior to the beginning of the viewable content in the previous version.

As mentioned above, the subsequent version of the content can be presented in response to a predetermined action performed by the user. However, conditions can be implemented regarding when performance of the predetermined action will lead to presentation of the subsequent version. For example, to ensure that the user reads a sufficient amount of the current content before moving on to the subsequent version, use of the predetermined action to cause presentation of the subsequent version can be conditioned such that the subsequent version is not presented on performance of the predetermined action unless a minimum predetermined number of units of content have been viewed 12 by the user prior to performance of the predetermined action. This enables the author of the document to prevent a user from jumping ahead to the subsequent version prematurely, before having read (and purchased) sufficient current content.

Figure 4:
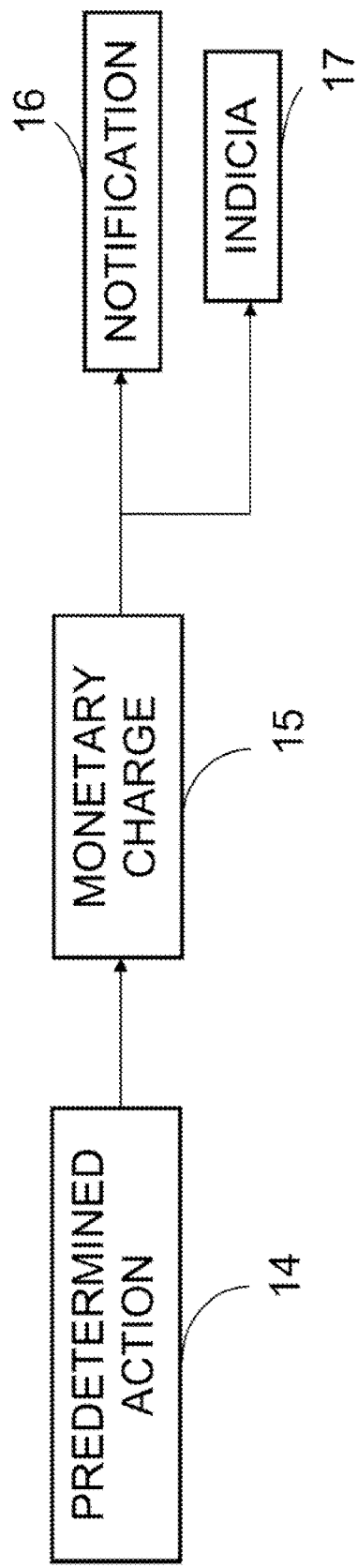
FIG. 4 is a flow diagram that shows a particular exemplary aspect of the monetary charge process of the invention.

As shown in FIG. 4, the author and/or publisher of the document file can charge a fee for consumption of the content by the user by assessing a monetary charge 15, for example, for every consumed unit of content, or for every performance of the predetermined action 14 or other designated event. A notification 16 can be provided to the user each time the charge is increased, or is about to be increased, and indicia 17 can be provided to the user showing the total monetary charge incurred during a session. The charge amount can represent an amount that the user will be required to pay, or an amount that will be deducted from a pre-paid account established by the user with the publisher.

Figure 5:
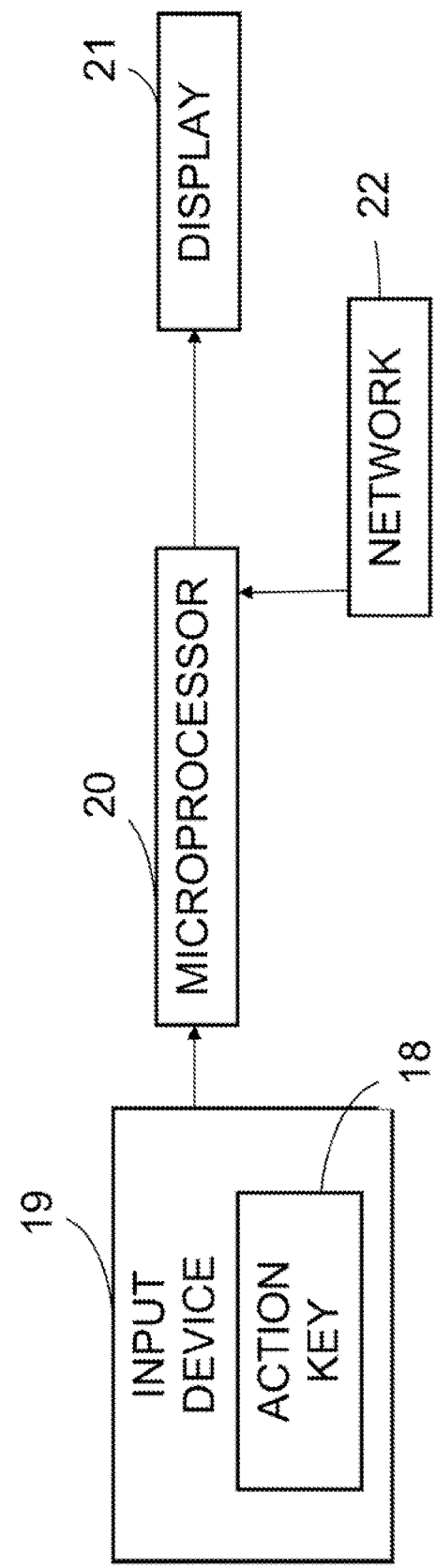

The predetermined action mentioned above can be any action designated by the publisher that is able to be performed on the user's viewing platform. As shown in FIG. 5, if the content is to be presented and viewed on a conventional computer or other typical microprocessor device 20 that is in communication with the electronic display device 21 and which can be connected for communication via a network 22, the predetermined action can be the depression of a keyboard key 18, combination of keys, or series of keys, for example. If the content is viewed on a dedicated viewing device, such as a device specifically designed to view content provided by the publisher or by publishers providing content according to the method of the invention, the designated action can be movement of an action key 18 on an input device 19, which can be designated specifically for this purpose. It is contemplated that any input action apparent to one of skill in the art can function as the predetermined action.

Figure 6:
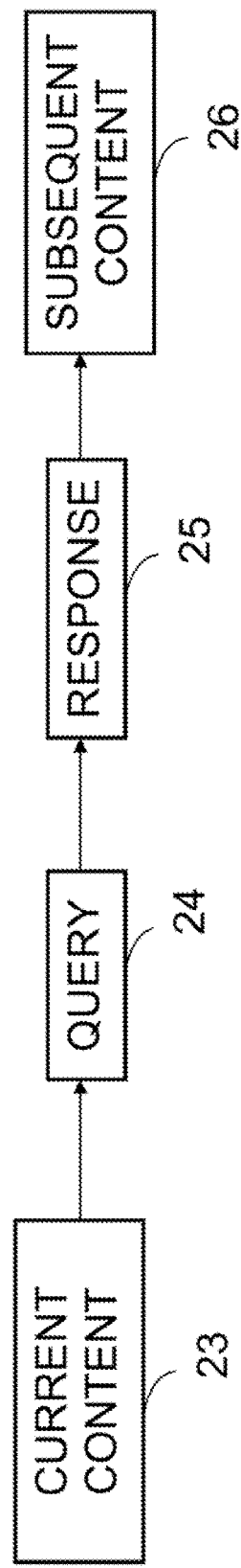
FIG. 6 is block diagram of an exemplary integrated device according to the invention.

The predetermined action can also be interactive. For example, as shown in FIG. 6, after consuming a certain predetermined amount of current content 23, the user can be presented with a query 24, such as one or more questions related to the substance of content consumed to that point, to which the user must provide an answer 25. The predetermined action would be the correct response to a question, or to a great enough percentage of a number of questions. If this requirement is satisfied, the subsequent content is presented to the use 26. If this requirement is not satisfied, the action is not deemed to have been performed, and the subsequent version (for example, a version in which unviewable content following the end of the current content becomes viewable) is not provided to the user. If the requirement is not satisfied, subsequent versions of the content can be forever denied to the user, as an example of a harsh consequence. Alternatively, the user may be offered an opportunity to answer the questions again, to answer related but different questions, or to re-consume the content on which the questions are based before being given a new opportunity to respond to the query.

The content itself can include, but does not necessarily include, text. The content can also include still images, animation, audio content, or any type of media or data that can be experienced by a user, and the term "view" as used herein is intended to encompass any such receiving experience by a user. Thus, the document file can be, for example, a plaintext file, an HTML file, and/or an XHTML file, and the content can also include at least one data tag, which can include formatting tags, hyperlink tags, image source tags, sound source tags, video source tags, table tags, form tags, frame tags, style tags, div tags, class tags, embed tags, object elements, JavaScript, Java applets, Flash units, and/or HTML5 units. The units by which the content is measured can be designated by the publisher to be of any size. For example, a unit can be designated to be a line of text, a sentence of text, a paragraph of text, a chapter of nixed-media content, a string of data, or any other measurable quantity of content, text or otherwise. A "page" of text, defined by the screen of the electronic display device on which the content is viewed, is another example of what can be designated as a unit of content. If the content is provided via a network interface and is viewed by the user in a browser window, that window can also be used to define the unit size.

Figure 7:
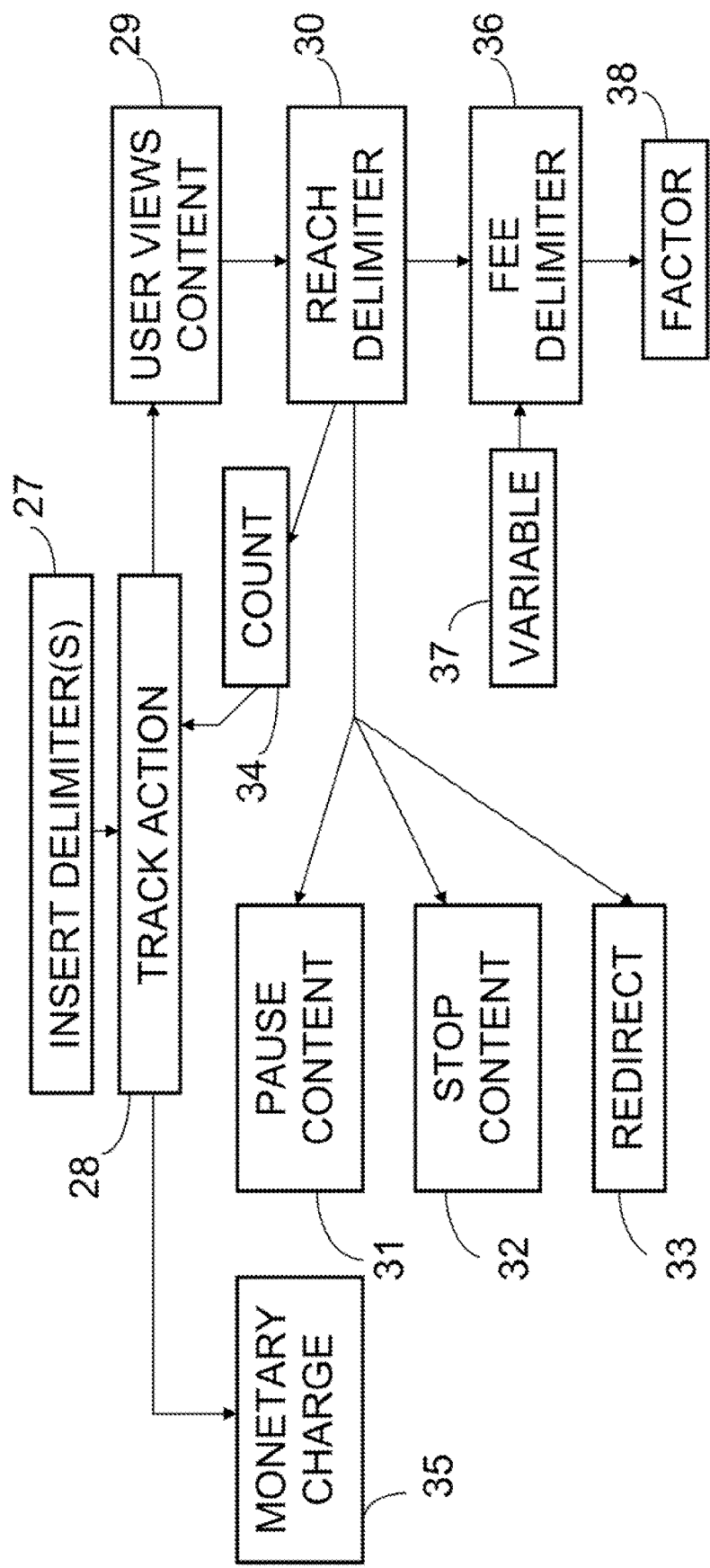
FIGS. 7 and 8 are flow diagrams of exemplary delimiter processes of the invention.
Figure 8:
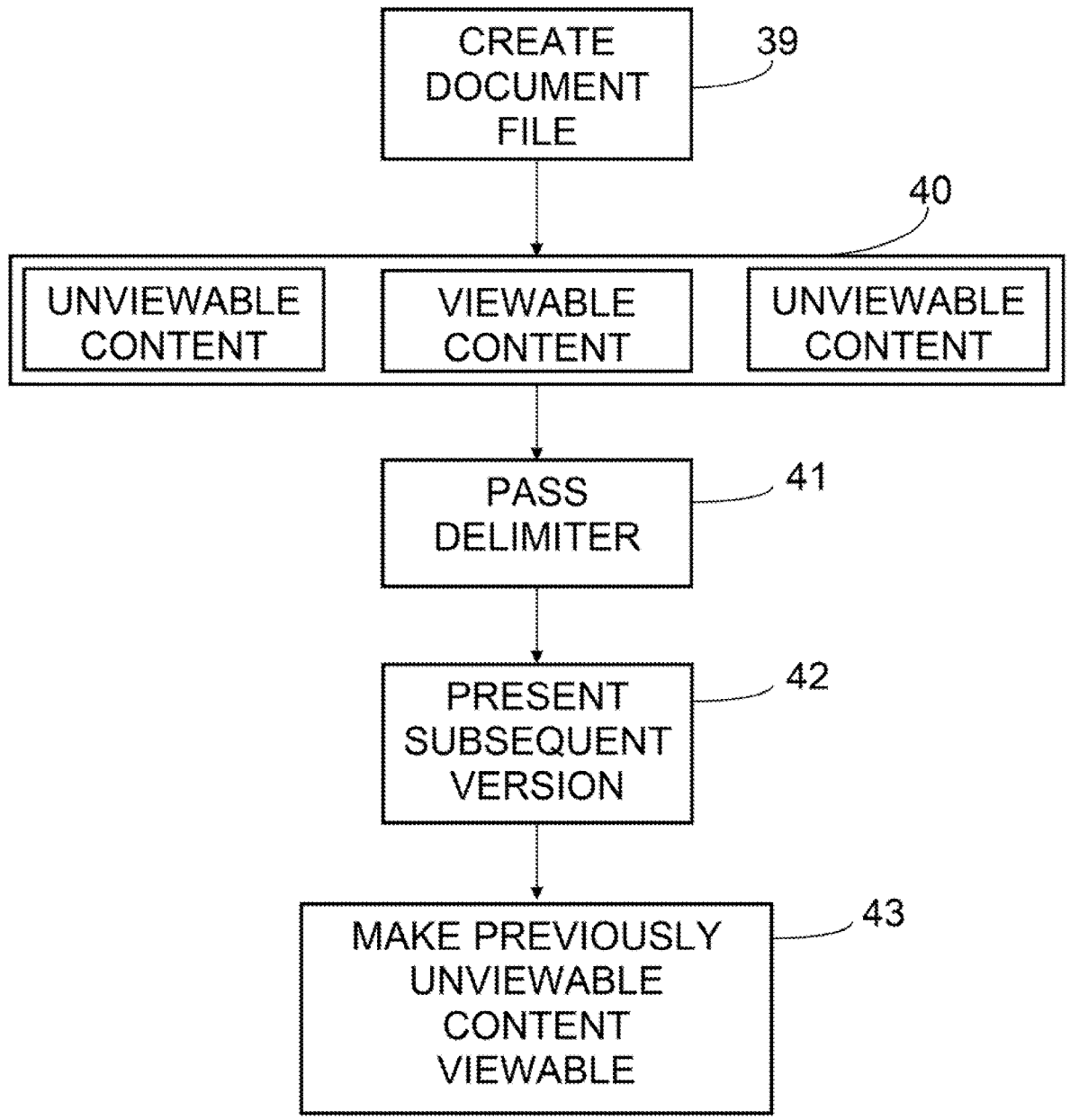

As shown in FIG. 7, if the document includes a textual portion, one or more delimiters can be inserted 27 at a selected position(s) of the textual portion to define delimited content. For example, at a selected position, the textual portion can be occupied by a particular character combination that includes a delimiter. When the delimiter is reached 30 as the user consumes units of content 29, advancement of content can be caused to stop 32 until further action is taken by the user. Alternatively, presentation of content can be paused 31 for a selectable, discrete number of time units.

Further, predetermined events and/or actions can be tracked 28 that occur while the user consumes units of content. For example, a number of active delimiters passed by the user by pressing the main action key while viewing currently viewable units of content, and/or a number of units of content passed by the user while viewing any units of content, whether currently viewable or subsequently viewable units of content, can be tracked and counted 34. More than one type of delimiter can be used, in which case tracking the delimiters can include separately tracking the delimiters of each type or of one particular type. The number of units of content passed by the user while viewing can be tracked by tracking actions performed by the user that cause a subsequent unit of content to be presented, or by automatically tracking the end of a current presented unit of content for which there is or is not a stop delimiter. In this way, consumption by the user of content can be tracked in order to determine the user's consumption data, for purposes of interest to the publisher.

For example, a monetary charge 35 can be associated with the tracked number of delimiters passed by the user, the tracked number of units of content passed by the user while viewing, movement of the action key, or any other tracked behavior. For example, each time a delimiter is passed by the user, or each time the number of units of content is passed while viewing, a total monetary charge can be increased. If the tracked unit of content is a string, a string counter can be incremented to track the number of units of content passed by the user while viewing, and the associated monetary charge is increased whenever the string counter is incremented.

A particular fee delimiter 36 can be designated separately from other delimiters, so that the monetary charge is associated with the tracked number of fee delimiters passed by the user can be used to increase the monetary charge rather than the tracked number of units of content consumed. This fee delimiter can be variable 37 in such a way as to make the associated monetary charge variable, for flexibility in charging a user for consuming content. In order to provide discounts or to otherwise provide a different fee schedule for different users consuming the same content, the instantaneous monetary charge and/or a cumulative monetary charge for the user can be multiplied by a user-associated factor 38. The user-associated factor can be determined by, for example, the user's reaching content-consumption goals, or the user's performance of a task, such as a task related to answering questions regarding substance of the content.

Figure 9:
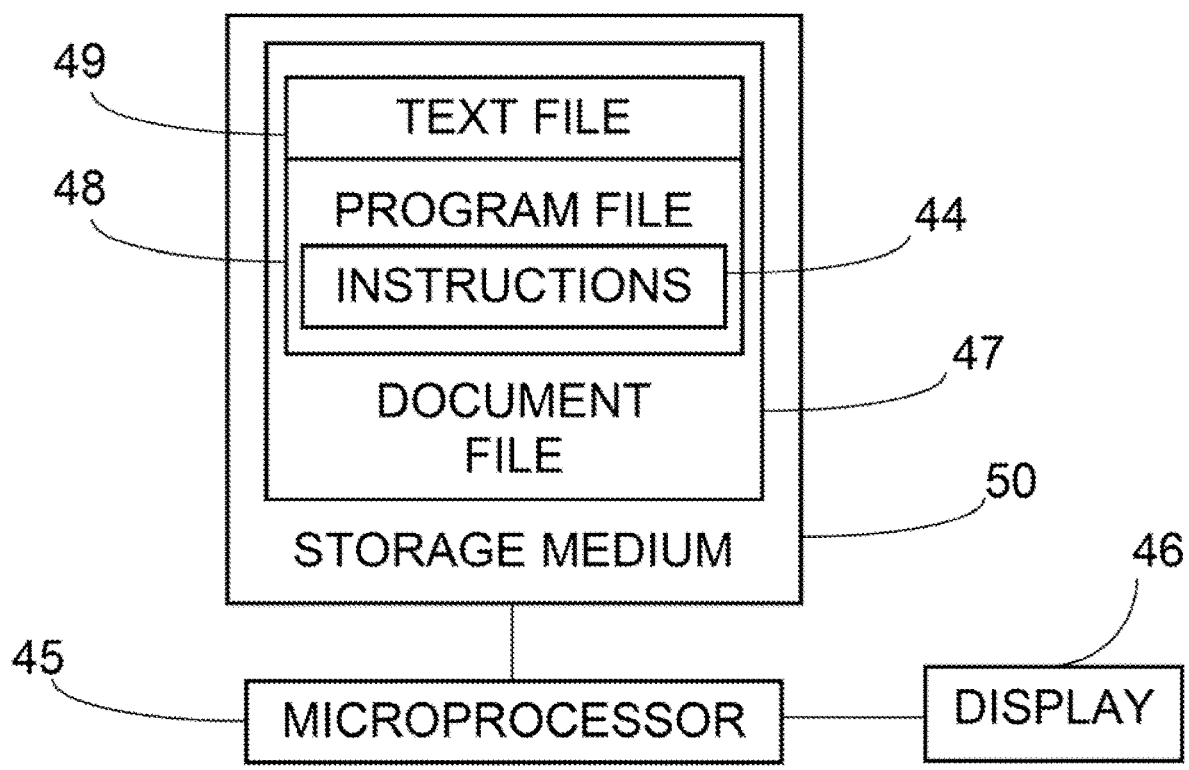
FIG. 9 is a block diagram of an exemplary integrated device according to the invention.
Figure 10:
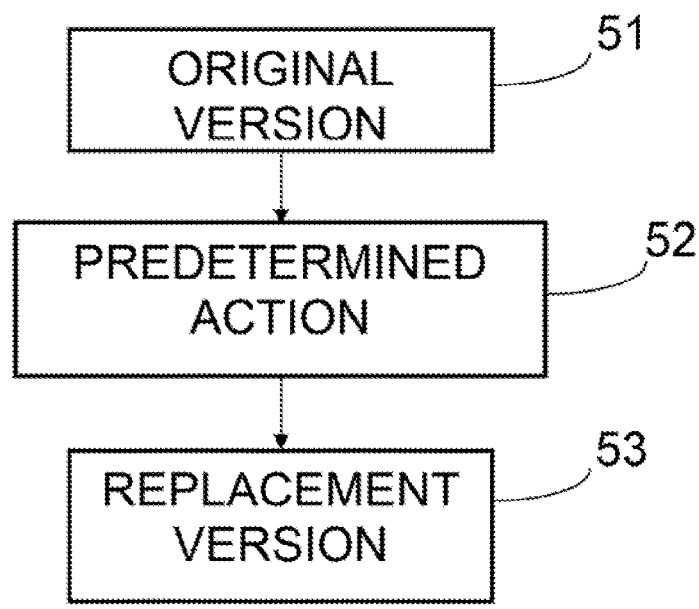
FIG. 10 is a flow diagram that shows an exemplary general process of the invention.

Presentation of the content to the user need not be restricted to revealing previously unviewable content to the user in subsequent version(s) by adding these to the current version of the content. Instead, for example, the content can be presented to the user in two or more discrete versions in controlled sequence, as shown in FIG. 10. An original or current version of the content, in which units of the content are currently viewable by the user, is presented 51. The user performs a predetermined action 52. In response to performance of the predetermined action, a subsequent version of the content presented 53. Thus, on performance of the action by the user, a complete replacement version of the content is presented for consumption, in which at least some units of the content can be added, removed, or otherwise different from the previous version As shown in FIG. 9, the invention can be embodied as an integrated device that includes a storage medium 50, a microprocessor device 45, and an electronic display device 46. The storage medium 50 includes intransient instructions 44 in the program file portion 48 of the variable computer-readable document file 47, The instructions 44 can be implemented by the microprocessor device 45 to cause content to be presented to the user on the electronic display device 46 according to the instructions 44. The instructions 44 in the program file 48 allow the author to create variable computer-readable content as a text file portion 49 of the document file 47, for presentation on the electronic display device 46. The text file portion 49 includes viewable content and unviewable content, presentable to the user as otherwise described herein. The instructions 44 included in the program file 48 are a computer-readable instructions that are largely unvarying and include previously programmed computer code allowing the document file 47 to be executed.

An executable file including the modified document file can be created at a first device and transferred from the first device to a receiving device. This receiving device can be a second device, or it can be the first device, such as when the first device is a node that is shared by two or more users. The transfer of the executable file can, for example, be made via email, which can be received by a recipient at another device, or by another recipient at the same device, usually via a different user account than that used by the sender. When transferred by email, the publisher's .exe attachment can be opened by the user from the email only if the receiving device is communicatively connected to a portable drive having a registered container ID; then the .exe will be stored immediately to the inserted portable drive.

As a means of preventing the illegitimate duplication of the publisher's email .exe attachment to a second or further registered portable drive, initial storage of the publisher's executable attachment including the modified document file can be limited to one designated registered portable drive.

Preferably, to achieve the designation, at the time of the acquisition of the modified document file from the publisher's Web site by the user, the user inserts the one registered portable drive into an accessory drive in the user's computer, while the publisher's computer records the container ID of the inserted registered portable drive, then transmitting to the user's email address the publisher's email executable attachment including the modified document file.

Subsequently to the initial storage of the executable attachment including the modified document file by the user to the designated registered portable drive, this .exe can be transferred to another registered portable drive. However, through the means discussed below, the designated registered portable drive cannot be employed by the user to store the publisher's email .exe attachment including the modified document file a second or further time. Therefore, any attempt by the user to create one or more duplicate copies of a purchased digital book can be frustrated.

The invention can be implemented through certain modifications being made to an existing Web browser, to an existing portable drive operating program, and to documents as described herein such that these documents, which will be executable documents, will bear their own unique extensions, such as ".N11" (TM), in place of, for example, ".txt," ".doc," ".htm" or ".html" extensions. When these modifications are made, documents authored according to the invention are playable only from and storable only to designated pieces of digital memory equipment, such as USB portable drives (memory stick, flash drive, thumb drive, etc.) or other hardware storage token, or in an alternate implementation, from and to the digital memory of particular computers and cell phones, for example. Likewise, when these innovations are implemented, various rigid and at this time-point unexpected and unusual restrictions can be placed upon viewers' use of electronic documents that they possess.

A conventional Jump Drive® or other portable drive has its own unmodifiable and unique serial number imbedded in it, just as every computer has a MAC address. This serial number in a portable drive can be considered the "container ID." Assuming that a digital publisher issues unique portable drives for use according to this invention, which will hereinafter be referred to as "registered portable drives," such drives are manufactured with, in addition to the regular container ID embedded on them, a stored special operating executable file to run the drive. This modified operating .exe file will include an "examine-alphanumeric-code before the .N11 executable file can be opened" function written into it. The possessor of such a drive cannot open, play, or reveal the text file or other source code of a document with an .N11 extension, except when this .N11 file is stored on a portable drive known by the publisher to be a registered portable drive. This restriction is made possible particularly because of the special nature of the new web browser, which can itself exclusively open, play, and show source code of .N11 files—this browser hereinafter referred to as the B-prime, or "B" (TM), browser—in conjunction with other features of this invention.

A B' browser can be used for security reasons, for example, in order to prevent an executable file with an .N11 extension from being opened and played and from having its source code revealed by any browser, other than a B' browser, and except where this .N11 executable file was already stored on a registered portable drive. An existing browser can be modified in several ways, to become the a browser. For example, it can be modified to permit the embedding of a unique code module, which may be an alphanumeric expression, at a designated location within its code. Further, it can be modified to "handicap" certain expected functions of a web browser, such as the "open" and "show source code" of a markup language's file functions, so that these will not be executed unless certain preconditions are met, and so that the "show source code" function can be limited in the currently unexpected and unusual ways discussed below. In addition, the browser can be modified to be able to check, at the request of the B' browser itself, a continuously updated list (maintained by the publisher, for example in an online database) of registered portable drives that have been issued by the publisher, for the presence or absence of a particular container ID.

Thus, each .N11 file issued according to this method will be stored only on a registered portable drive, and each .N11 executable file issued according to this method will initially only be stored on the registered portable drive designated by the user and the publisher for the initial storage of the .N11.file—or alternatively, initially only stored to registered devices of a different, yet comparable electronic storage medium type, including ones not yet marketed and/or ones utilizing technology not yet invented, including proprietary types—and will include in its file name the unique alphanumeric code issued by the publisher at dissemination. A "check-alphanumeric-in-file name" function of the jump-drive operating program will determine if this filename code is valid, whether it is, being determined preferably by algorithmic comparison of the alphanumeric codes of the filename and storage device. Then, assuming that the checked code is valid, a second function of the jump-drive operating program, a "check-alphanumeric-code-in-the-browser" function, will examine the code alphanumeric that is located in the B' browser program to determine if it is a valid B' browser, whether it is, being determined preferably by algorithm. Only if both preconditions are met will an .N11 document file then be extracted from the .N11 executable by the jump-drive operating program, copied to temporary memory in the computing device, and finally opened by the B' browser in a browser window.

When a file is opened in a B' browser window, a handicapped "show source" function of this browser can reveal the source code of the .N11 file, but only if the browser has determined that a registered portable drive is present in one of the peripheral slots (such as D:, E:, F:, G:) of the electronic device running the browser. To prevent a viewer from disabling security and payment features of .N11 documents, the content files and program files of .N11 document files can be made separable and the B' browsers "show source" function handicapped so that only content files and not also program files will be revealed. Furthermore, to prevent a viewer from disabling payment features of .N11 documents, the "show source code" function of the B' browser can be handicapped so as not to permit payment delimiters to be revealed to the user.

The operating program of a registered portable drive will not allow the electronic device running the B' browser to store any document on this drive unless the file is an executable and has an .N11 file extension, and it will not permit storing of any .N11 executable file, including any .N11 executable whose subordinate .N11 document files that have been altered by a user, for example, to include his own "marginal notes," except on a drive whereupon an .N11 executable file with the same name is already present, and then only by overwriting this existing .N11 file. To stress and emphasize, the storing of documents by a viewer on internal computer memory media, or on external electronic memory media other than the registered portable drives here discussed—yet excepting devices that are similar to portable drives, where the publisher deems these to be "more advantageous" from its vantage point than portable drives—will be blocked by the publisher according to the invention.

Copies of the B' browser are each assigned an alphanumeric code at the time of their installation on an electronic device. Such copies of the browser will be made available to users, for example by free download from the publisher's website. This browser will be programmed in a computer language that can be compiled into an executable file. Because this code will be compiled, it will be difficult or impossible to fraudulently reverse engineer, including by the inclusion of a fraudulently created browser alphanumeric code. Preferably, the algorithm used to generate alphanumeric codes, and concomitantly to determine whether alphanumeric codes that appear in .N11 executable file names or individual copies of the B' browser are "valid," will be kept outside the public domain. Thus, efforts to fraudulently distribute electronic reading material in order to bypass the correct assessment of fees by a publisher will to an extent be frustrated.

According to this embodiment, individual copies of electronic books, pamphlets, articles, and other materials in electronic form will be available directly from the publisher's website after payment of a variable "maximum use fee" by each user. For example, a user wishing to obtain an electronic book or other materials will go to the publisher's website and log on there by providing his email address or other identifier and subsequently a payment method, for example, credit card account details. After log-on and provision of a payment method, users will be directed to separate web pages where a publication list is located. This list will indicate each item for sale, for example, at least by its title and maximum user fee. The maximum user fee will be variable, from free to any fixed maximum amount, at the publisher's discretion.

When the user has identified an item that he wishes to procure, he will obtain it by selecting the item name, which will be a hyperlink, and then in a separate screen, by selecting a radio button to confirm his purchase, thereby paying the listed amount and receiving an email message having the selected item sent as an attachment. This attachment will be written as an .exe file so that it will not exactly comprise the document representing the electronic book or other item. Therefore, it will not exclusively consist of the respective .N11 file that is to be played in a B' browser after storage on a registered portable drive. Rather, the attachment will "embrace" the .N11 file, allowing it to be opened and the document contents immediately to be transferred to and stored on a registered portable drive, after certain preconditions have been determined to have been met. If out of security concerns, .exe files are not allowed to be opened directly from email attachments by, for example, antivirus software, corporate security policy implementations, or electronic-device operating platform measures, a storage step or other intermediate action will be performed.

Each published item purchased from a publisher's website will be assigned, at the moment of its creation by the publisher's website program, a suitable alphanumeric code that will be present in the file name of the .N11.exe attachment. When the user opens this .exe from within his email program, it will be immediately stored on the registered portable drive then in use as the same .N11 executable document, upon certain conditions being met. For example, a registered portable drive must be found on or in direct communication with the device that is running the email program. Whether this drive is thusly present will be determined by the B' browser that has been designated to open the .exe, for example by examining the peripheral slots of the electronic device running the browser, first for the presence of a registered portable drive, and second for whether there is a valid container ID number on that drive. Further, the attachment .N11.exe file's alphanumeric code must be valid. Whether it is valid will be determined by the B' browser. Additionally, this registered portable drive must be the registered portable drive designated by the user and the publisher to initially store the .N11 executable document. If all three conditions are met, the operating .exe file of the registered portable drive will download the attachment .N11.exe file and store it on the designated registered portable drive under the same .N11 executable file name that will still encompass the alphanumeric code.

To prevent the acquisition by the user of more than one downloaded copy of the .N11 executable purchased by the user by means of the downloading of the .N11 executable attachment from publisher's email more than one time, whether onto one or onto more than one registered portable drive, the user at the time of the purchase of the .N11 executable document will designate a particular registered portable drive for the initial downloading and storage of the publisher's .N11 executable email attachment. The user will do so by inserting the particular registered portable drive into a peripheral slot of the computing device used to communicate with the publisher's Web site for purchase of the .N11 document. At the point of purchase, the container ID of the particular registered portable drive will be stored by the publisher's computer in the .N11 executable as a string variable. Then at the point where the publisher attaches and sends as an executable .N11 email attachment the purchased .N11 document to the user, this string variable will be encoded within the .N11 executable attachment emailed to the user.

When the user receives the publisher's email, he or she will insert the same designated registered portable drive into a peripheral drive on the computing device used to receive the email. When the user attempts to open and transfer the .N11 executable email attachment to the designated registered portable drive, the operating executable file of the registered portable drive will determine whether the container ID of the registered portable drive is contained within the string variable in the .N11 executable attachment, and then only if it is, will the operating executable file of the registered portable drive allow the .N11 executable email attachment to be downloaded and stored to the registered portable drive.

When the user opens the .N11 executable from the registered portable drive to view the encompassed .N11 document file with the B' browser, the modified operating system of the registered portable drive will disarticulate the .N11 executable stored on the registered portable drive, to copy and thereafter store only the .N11 document file coding for the digital .N11 document, together with the associated string variable storing the container ID of the registered portable drive, in temporary memory of the user's computing device, Simultaneously, the modified operating system of the registered portable drive will assign a value of 1 to a binary variable associated with the .N11 executable file stored on the designated registered portable drive inserted in a peripheral drive on the user's computer. The binary variable when having a value of 1, in conjunction with the associated string variable storing the container ID of the registered portable drive, will prevent by the modified operating system of the registered portable drive the opening and copying of the .N11 executable from the registered portable drive to any computing device. Only when the user closes the .N11.digital document by closing the B' browser, will the value of the binary value be changed from 1 to 0, allowing the .N11 executable again to be copied and thereafter stored into temporary memory of a computing device, according to the same procedure.

Additionally, the presence of the string variable storing the container ID of the designated registered portable device, within the .N11 executable, as both are stored on a registered portable drive, will prevent the .N11 executable attachment from being downloaded from the publisher's and stored, that is, a further time.

If the user wishes, he or she may copy the .N11 executable from a first registered portable drive to a second registered portable drive; however, subsequently, the same protocol referenced above will apply. That is, at the time of the copying of the .N11 executable from the first registered portable drive to the second registered portable drive, a binary variable associated with the .N11 executable stored on the first registered portable drive will be assigned a value of 1. The value of the associated binary variable will remain 1, and, therefore, the .N11 stored on the first registered portable drive will remain unusable, unless and until an acceptable payment is made to the publisher of the .N11 digital document, the payment, for example, equivalent to the current price of the .N11 digital document on the publisher's Web site.

Multiple .N11.exe attachments may be stored on a single registered portable drive, making it in effect a "library" for all of the respective .N11 documents. Preferably, at the time of purchase, all .N11 documents will exist in a single copy. Regardless of whether a user chooses to place one or chooses to place multiple .N11 materials on a single drive, he or she will be able to transfer these singly, as individual items, to other drives. Regardless of whether he stores many .N11 materials on the same drive or only on multiple drives, he will have but one copy of each one, whether this copy is annotated or is unmodified by the user, to keep or to loan out, unless he opts to purchase multiple copies of any .N11.

If a publisher wishes to charge users to read .N11 items, he will have a novel means by which he may do so according to an embodiment of the method of this invention. Through use of a fee delimiter type mentioned above, the publisher will be able to charge a varying amount, from no fee up to an indefinitely large fee, each time the user passes such a delimiter within the currently viewable version of the .N11 digital file (under certain circumstances, a user will be paid to read an .N11 item, in which case negative fee amounts will be incurred). The publisher who utilizes such an approach will store on the registered portable drives he makes available a second .exe file, or other compiled program. This .exe file's function will be to maintain an account for the user with respect to this publisher. When a user acquires .N11 items, his maximum use fee will be stored into individual variables in this account .exe file on the registered drive. When a user reads one of these items, as he passes a fee delimiter, the amount in the .N11 item's amount variable will be decremented according to the fee delimiter in question, where accounts are pre-paid. Of course, other payment schemes, such as credit models, may be used, in which case the amount variable can be incremented.

Broadly speaking, "access" to a digital asset includes a variety of categories of access, such as read access, write access, sharing or publication access, modification or alteration access, duplication access, and any other type of access or permissions granted with respect to the digital asset. The present invention encompasses methods of restricting and/or controlling the duplication, altering, dissemination, and other forms of access of document files, individually or in combination, through use of an inventive content management system. Further, such a digital asset can include any form of content, including text, sound (such as a music file), still image (such as a photographic image), or moving or animated image (such as a movie file), alone or in combination as part of a multimedia file. For simplicity of discussion, such digital assets are referred to herein as document files, which term shall encompass any type of mono-media or multimedia file. Such files can include interleaves as described elsewhere herein, or can be simple non-interleaved documents, regardless of pagination scheme or arrangement.

Figure 11:
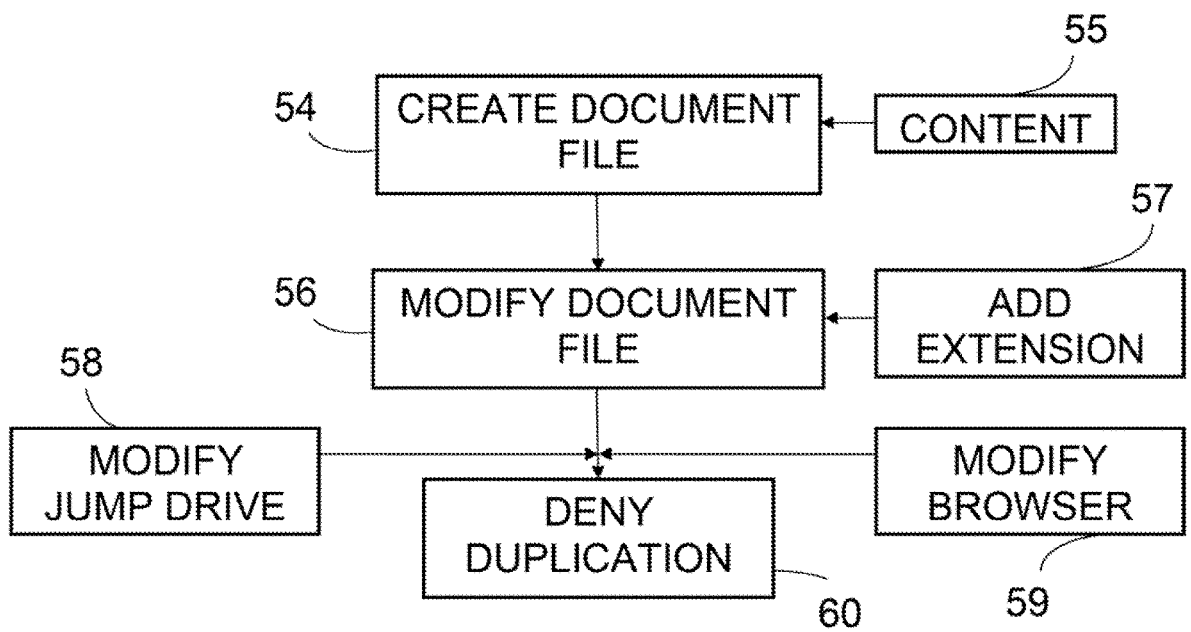
FIGS. 11 and 12 are flow diagrams that show exemplary general duplication-prevention processes of the invention.

Thus, the present invention also encompasses methods of restricting or controlling the duplication, altering, and dissemination of document files. As shown in FIG. 11, prevention of unauthorized modification of a document file can also be provided when creating 54 the document file. As mentioned previously, the document file is a variable computer-readable file that includes content 55 for presentation to a user. A browser 59 that acts as an interface used to present the content, a portable drive operating system 58 for a Jump Drive®, thumb drive, flash drive, or other portable drive on which the document file can be stored, and/or the document file 56 can be modified as part of a duplication-prevention process. Modifying the portable drive operating system, for example, can include restricting the portable drive operating system such that modified document files stored on the modified portable drive cannot be opened by other than the modified browser. The modifications to the document file, the portable drive, and/or the browser can conjointly render the modified document file unable to be duplicated 60.

Figure 12:
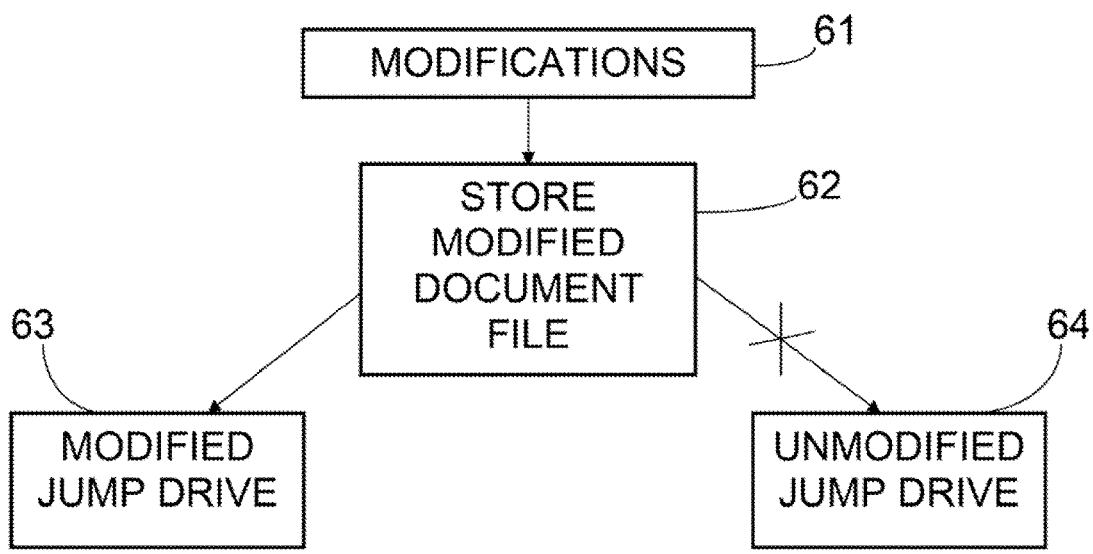
Figure 13:
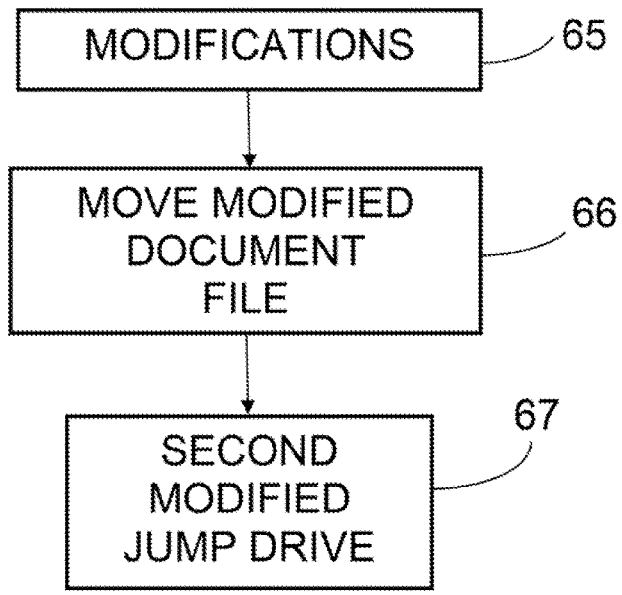
FIGS. 13 and 14 are flow diagrams that show particular exemplary aspect of the copy process of the invention.
Figure 14:
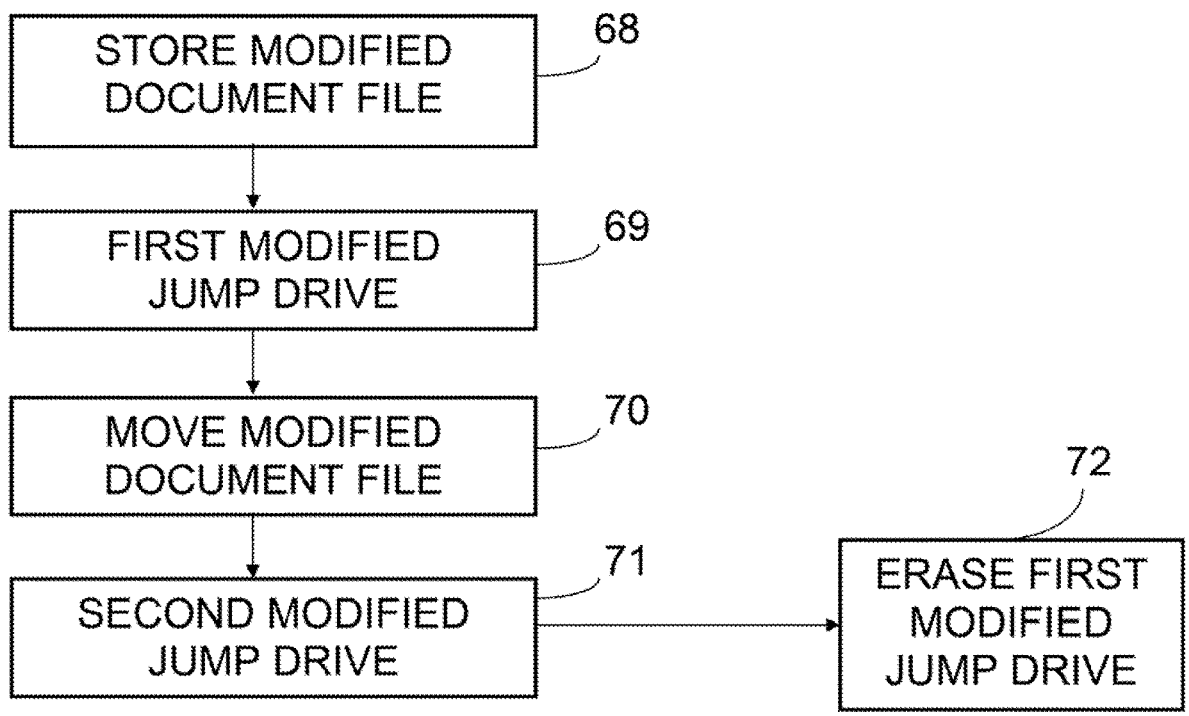

For example, the document file can be modified to include a designated extension 57. As shown in FIG. 12, the designated extension and other modifications 61 render the modified document file unable to be stored 62 except on a modified portable drive 66, which is a portable drive including the modified portable drive operating system. The modified document file may not be stored on an unmodified portable drive 64, that is, a portable drive having a conventional, unmodified operating system. Other conditions can be imposed with respect to moving the modified document file. For example, as shown in FIG. 13, if the modified document file is currently stored on a first modified portable drive, the modified document file can be moved 66 to a second modified portable drive 67. However, the modifications 65 can conjointly render the modified document file able to be moved from this original storage location only if the modified document file is stored on a designated second modified portable drive, and not on an unmodified portable drive.

Figure 15:
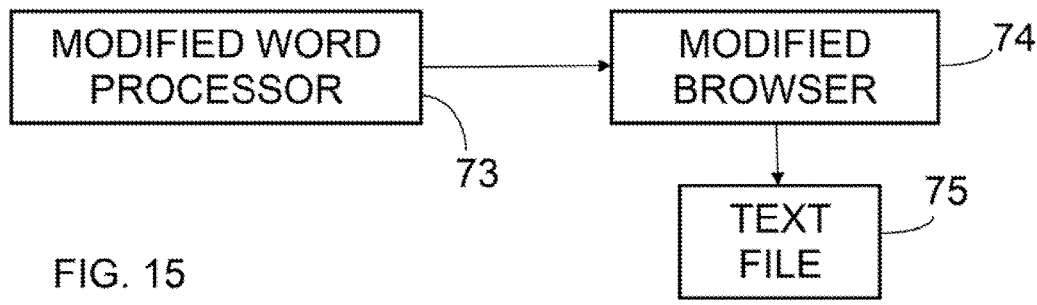
FIG. 15 is a flow diagram that shows a particular exemplary aspect of the authoring process of the invention.

However, it is possible for the modified document file document file, stored on the modified portable drive, to be altered by a user. The modifications can conjointly render the modified document file having the modified text file portion able to be stored only on the modified portable drive. As shown in FIG. 15, the modified document file can be altered by a user by copying only a text file portion 75 of the modified document file using a modified word processor 73 that is configured within the modified browser 74. The copied text file portion of the modified document file can be altered using the modified word processor, and the altered copied text file portion of the modified document file can be stored using the modified word processor by replacing the text file portion of the modified document file stored on the modified portable drive by the altered copied text file portion of the modified document file, and using the modified browser conjointly with the modified portable drive operating system to store the altered modified document file. In this case, the browser can be restricted such that it can only open a text file using the modified word processor. Thus, alteration of a document by a user is possible, but is restricted to alteration using a modified word processor, and storage of the altered document file is also restricted.

Figure 16:
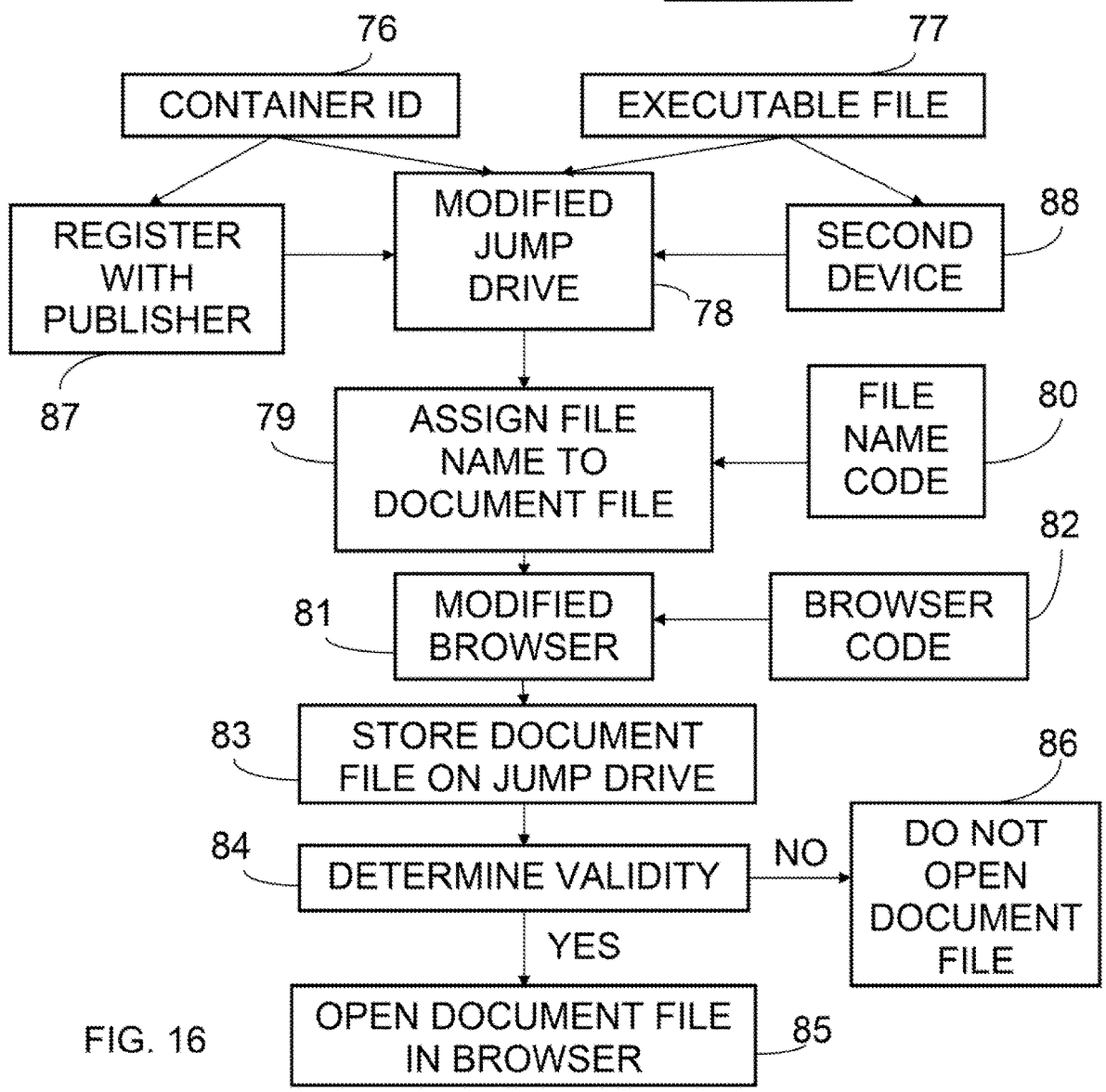
FIG. 16 is a flow diagram that shows an exemplary general process of the invention.
Figure 17:
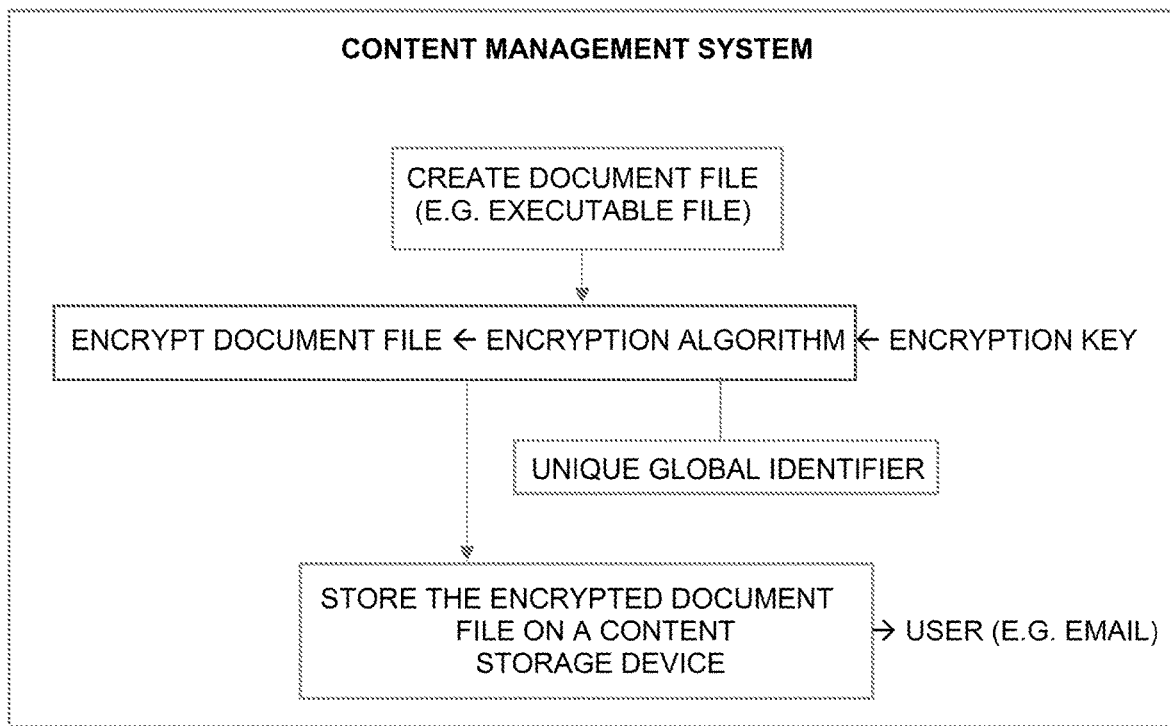
FIGS. 17-24 are flow diagrams showing aspects of an exemplary content management system according to the invention.
Figure 18:
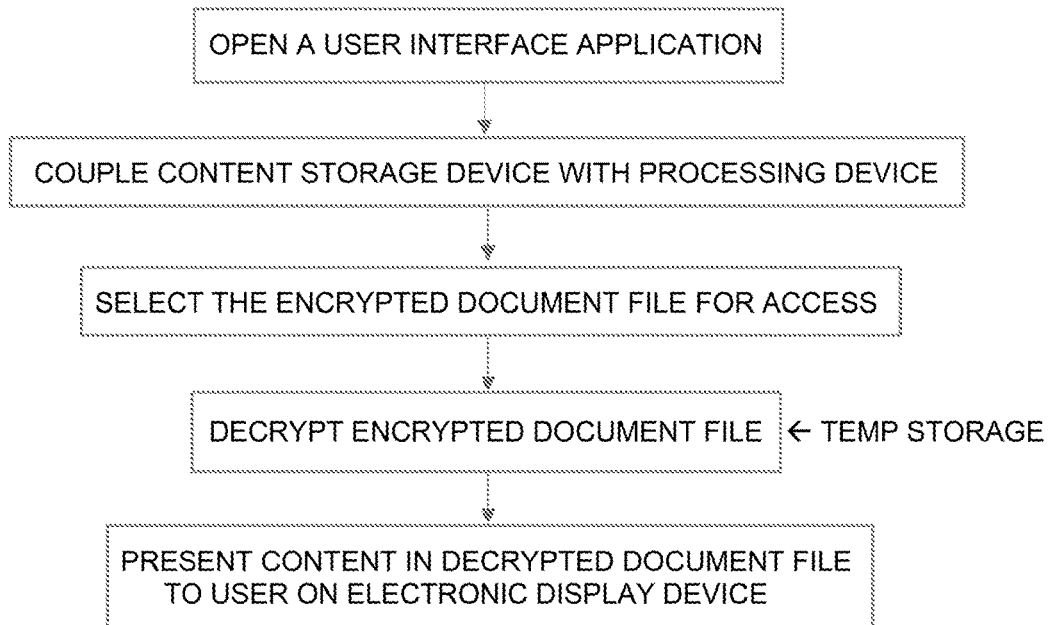
Figure 19:
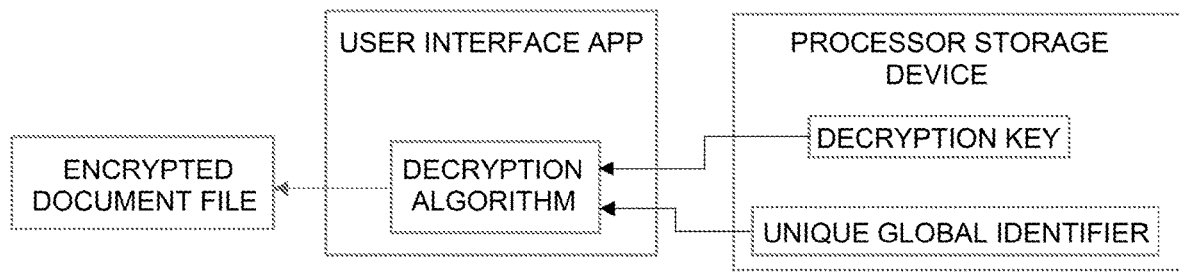
Figure 20:
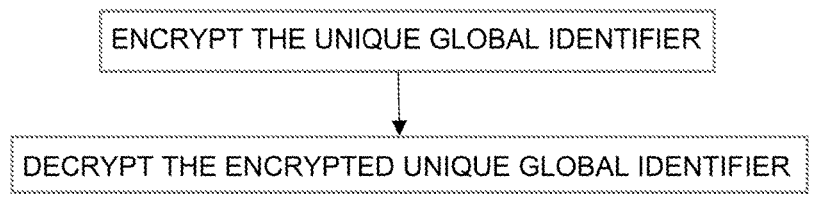
Figure 21:
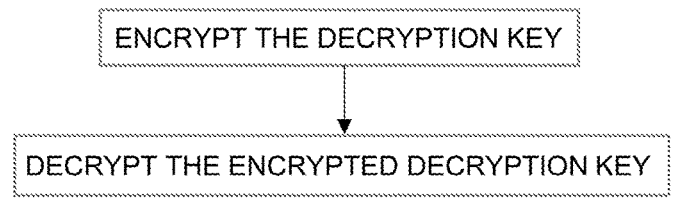
Figure 22:
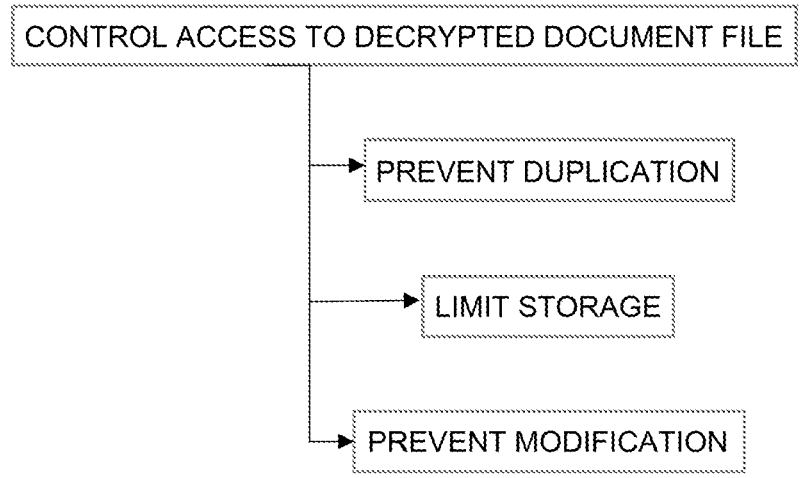
Figure 23:
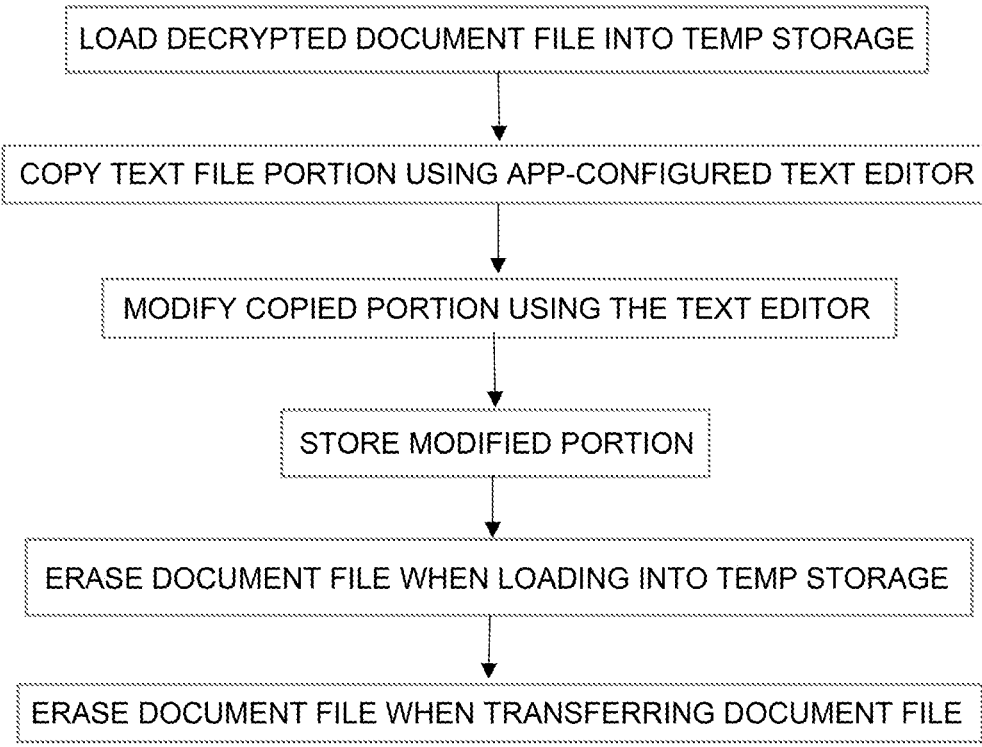
Figure 24:
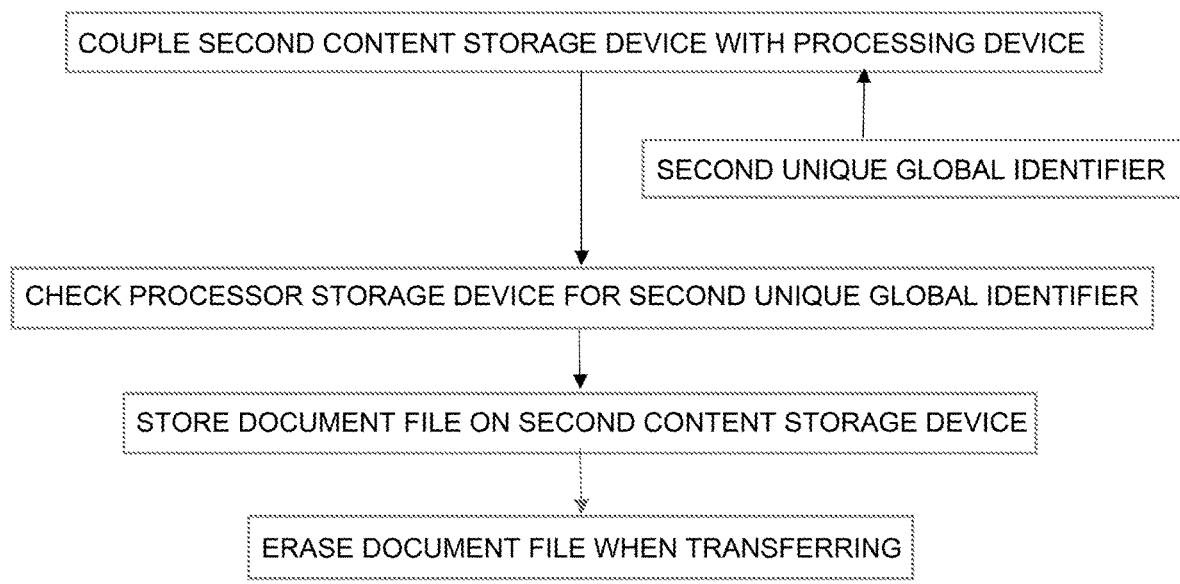

As shown in FIG. 16, a container ID 76 and an operating executable file 77 can be stored on a portable drive 78 associated with the modified portable drive operating system. A filename is assigned 79 to the modified document file in which the filename includes a designated filename code 80. A designated browser code 82 is assigned to the modified browser 81. The modified document file is stored 83 on the modified portable drive. An operating program associated with the operating executable file is used to determine if the filename code is valid, based on a predetermined criterion, and the operating program associated with the operating executable file is then used to determine if the browser code is valid, based on a predetermined criterion. A condition is applied such that opening the modified document file in a browser window by the modified browser 85 occurs only if the filename code and the browser code are both determined to be valid 84, and otherwise opening the modified document file is not allowed 86. The container ID is registered with the publisher 87. Thus, storage of the modified document file on any portable drive, whether modified or not, having an unregistered container ID can be prevented.

With reference to FIGS. 17-24, prevention of unauthorized modification of a document file can be provided when creating the document file. The document file is a processor-readable file that can be mutable or immutable and includes content for presentation to a user. Such a file can be ephemeral or fixed in a tangible medium, and can refer to a file that is stored temporarily or permanently, or content that is in transit, such as while shared over a network or a communications channel. For example, the document file can be a text document stored on a thumb drive, or a music file stored on a compact disc, or a broadcast radio communication. A dedicated browser or other user interface application used to present the content, and a portable storage device having a globally unique identifier on which the document file can be stored, are used under control of a content management system to enforce duplication prevention and other access control through the use of encryption.

For example, the document file can be encrypted by the publisher before being stored on the storage device and provided to the user. The publisher only stores the encrypted document file on a storage device that is associated with a globally unique identifier and is registered with the content management system, and the encryption process can include the identifier, thereby linking the encrypted document file to the particular storage device on which it is stored. The encrypted document file may only be decrypted by a user providing an identifier corresponding to the globally unique identifier, such as the globally unique identifier itself, a mapped value, or an index value.

Access rights of any type need not be granted completely with respect to a document file, and may be parsed and changed over time or in response to activity by the user. For example, read-only access may be granted to a user with respect to a text file to be viewed via the user interface application/browser, but complete access might be withheld at first. However, access might only be granted to the user incrementally as the user makes progress payments of the total access price; the unpaid-for portions can be redacted, or encrypted, until further payments are received. Alternatively, portions of the text, such as interleaves, may be hidden throughout the text file on a first reading by the user. Read access to these portions can be withheld until the user consumes the text to the end, or to a predetermined point, for the first time. Access to different portions can be granted based on different conditions, at the discretion of the publisher. In this way, a user will only be able to view portions of the text file corresponding to conditions that he has satisfied, based for example on previous payment or consumption.

Other conditions can be imposed with respect to moving the encrypted document file. For example, if the encrypted document file is currently stored on a first registered storage device, the encrypted document file can be moved to a second registered storage device. However, the content management system can render the encrypted document file able to be moved from this original storage location only if the encrypted document file is stored on a designated second registered storage device, and not on an unregistered storage device. As another example, the content management system can render the encrypted document file able to be moved from a first registered storage device on which it is stored to a second registered storage device only if the encrypted document file is erased from the first registered storage device, and unable to be moved to a different registered storage device otherwise. Further, the document file will have to be encrypted using the globally unique identifier of the second storage device before it can be stored on that device. Thus, only a single instance of the document file will ever exist except possibly ephemerally in temporary storage during the transfer, unless additional access permissions are granted by the publisher and enabled by the content management system.

With proper access permissions granted by the publisher, it is possible for the encrypted document file, stored on the registered storage device, to be altered or modified by a user. To enable alteration by a user, only a content portion of the encrypted document file is first copied using a dedicated content editor that is configured within the dedicated browser or other user interface. The copied content portion of the encrypted document file can be altered using the dedicated content editor, and the altered copied content portion of the encrypted document file can be stored using the dedicated content editor by replacing the original content portion of the encrypted document file stored on the registered storage device by the altered copied content portion of the encrypted document file, and using the dedicated browser conjointly with the registered storage device operating system to store the altered encrypted document file. In this case, the browser can be restricted such that it can only open a content portion using the dedicated content editor. Thus, alteration of a document by a user is possible, but is restricted to alteration using a dedicated content editor, and storage of the altered document file is also restricted to the registered storage device in encrypted form.

The encryption/decryption process enforced by the content management system can also require the use of cryptographic keys as part of the encryption/decryption process. For example, an encryption key, along with the globally unique identifier, can be used as inputs to an encryption algorithm to generate the encrypted document file to be stored on the registered storage device, according to any encryption process apparent to those of skill in the art. Likewise, the user, at his or her processing device, must supply an identifier associated with the globally unique identifier and a decryption key corresponding to the encryption key, to decrypt the encrypted document file before the document file can be accessed by the user. According to cryptographic schemes apparent to those of skill in the art, the content management system can enforce policies to grant particular document file access to the user. For example, "read-only" access can be granted to a particular user for a particular document file at a particular device, which access can be expanded or otherwise changed at the discretion of the publisher and though the control of the content management system. Likewise, browser functions can be controlled by the content management system. For example, the screenshot function of the user's computer can be enabled or disabled by the content management system for particular files or particular users as part of the access control that follows the document.

Further, an executable file including the encrypted document file can be created at a first device and transferred from the first device as a sending device to a receiving device. This receiving device can be a second device, or it can be the first device, such as when the first device is a node that is shared by two or more users. For example, the transfer of the executable file can be made via email, which can be received by a recipient at another device, or by another recipient at the same device, usually via a different user account than that used by the sender. The encrypted document file can be opened from the executable file only if the receiving device is communicatively connected to a registered storage device. If this is the case, the encrypted document file is stored on the registered storage device. Opening the encrypted document file if the receiving device is not communicatively connected to a registered storage device is thereby prevented. In this way, dissemination of digital files of any type via email can be controlled by the publisher, and access to the file can be controlled as well.

For example, the publisher can limit the transaction to a single download (or to any particular desired number or range of numbers of downloads), and can control the manner of access (read, modify, duplicate, etc.) to the file once downloaded. Access control is enforced through the encryption process, administered by the content management system, and executed by the dedicated browser, according to parameters set by the publisher. Publishers can use the system to disseminate files of different types, such as text files, sound files, etc., in both modifiable and unmodifiable versions that are otherwise identical, and even in versions in which only one or more portions of the file are modifiable. Alternatively, a single version of the file can be disseminated, and control of whether modification is allowed can be enforced through permissions associated with the receiving user, enforced by the encryption scheme.

Each copy of a particular digital document issued by a publisher can be assigned a unique alphanumeric identifier specific to the document. This identifier can be, for example, implemented as the filename of the executable file to be disseminated and/or added as a header to the disseminated file. Using this identifier, the publisher can control access to the executable file, such as by preventing the creation of copies of executable file, or by controlling the number of copies that may be made or the manner in which they are made.

According to the method of the invention, the alphanumeric identifier assigned to the executable attachment is stored in a defined string variable on a processor-enabled smart storage device as the executable attachment is stored on the smart storage device, per instructions in the operating system of the smart storage device. This assignment of the identifier value to the string variable preferably is permanent, according to instructions implemented in the smart storage device operating system, such that the identifier value can never be erased, modified, over-written, or deleted from the string variable.

Further, before any executable attachment can be downloaded onto the smart storage device that is authorized for it as described above, the smart storage device must according to instructions in the smart storage device operating system query the string variable to determine if the executable file's alphanumeric identifier value is among the values currently assigned to the string variable. If the alphanumeric identifier value of the file is included among the values assigned to the string variable, this is an indication that the executable file has previously been transferred to that smart storage device, and therefore transfer of the executable file to the smart storage device in this instance will be blocked. Thus, according to this method, the executable file can be downloaded at most once onto a smart storage device from an email message to which an executable file has been present as an attachment. Of course, if the publisher wants to limit the number of authorized downloads to a specific number greater than one, or to a range of numbers, the scheme can be modified to include a series of identifiers, a match counter, or some other scalable implementation.

The correct alphanumeric identifier value is assigned to an executable attachment by the publishers server to implement the method. For example, before a user requests a digital document from the publishers website, the user can provide to the publisher a unit number (or some other identifier that is apparent to the user) of the smart storage device to which the executable file will be stored. Through the use of a look-up table or the like, the publisher's server will determine the unique encrypted global identifier of the target smart storage device.

Enforced by a publisher's server-side encryption program, the unique encrypted global identifier, in conjunction with a unique item number assigned to the digital document by the publisher at the time of its publication, is utilized to assign the correct unique alphanumeric value to the executable file. Another identifier indicating the number of times the executable file has been transferred to the same user and/or assigned to the same smart storage device, can be included in the data used to assign the correct unique alphanumeric value to the executable file.

As described elsewhere herein, file transfer can be controlled such that an executable file or document file can be only be transferred between storage devices if the file is deleted from the original device as it is being transferred to the destination device. Likewise, in this scenario, a file can only be returned to the original smart storage device when the file is simultaneously erased from the subsequent smart storage device. In this case, the presence of the executable file's alphanumeric identifier value in the defined string variable will not be countermanding, according to instructions implemented in the operating instructions of both smart storage devices, but more relevantly the first smart storage device.

According to the control scheme described above, in order for a user to obtain a second, or third, and so forth, copy of a digital document from its publisher, he or she would have to assign the respective further executable file, or executable files, to a different smart storage device, or devices. However, the publisher may allow the user to assign the second executable file or second and further executable files to the same original smart storage device, through modification of the executable file's unique alphanumeric identifier value. For example, the publisher may allow the user at the publisher's website, at the time when the procuring of the further digital document or documents occurs, to modify the executable file's unique alphanumeric identifier value for each copy to indicate a series of otherwise identical files, for example by emplacing in lieu of the number "1" during the process through which the executable attachments unique correct alphanumeric value will be set, the number "2", or "3", and so forth, as appropriate, or by other similar modification that according to the content management system indicates multiple instances of the same file.

Figure 25:
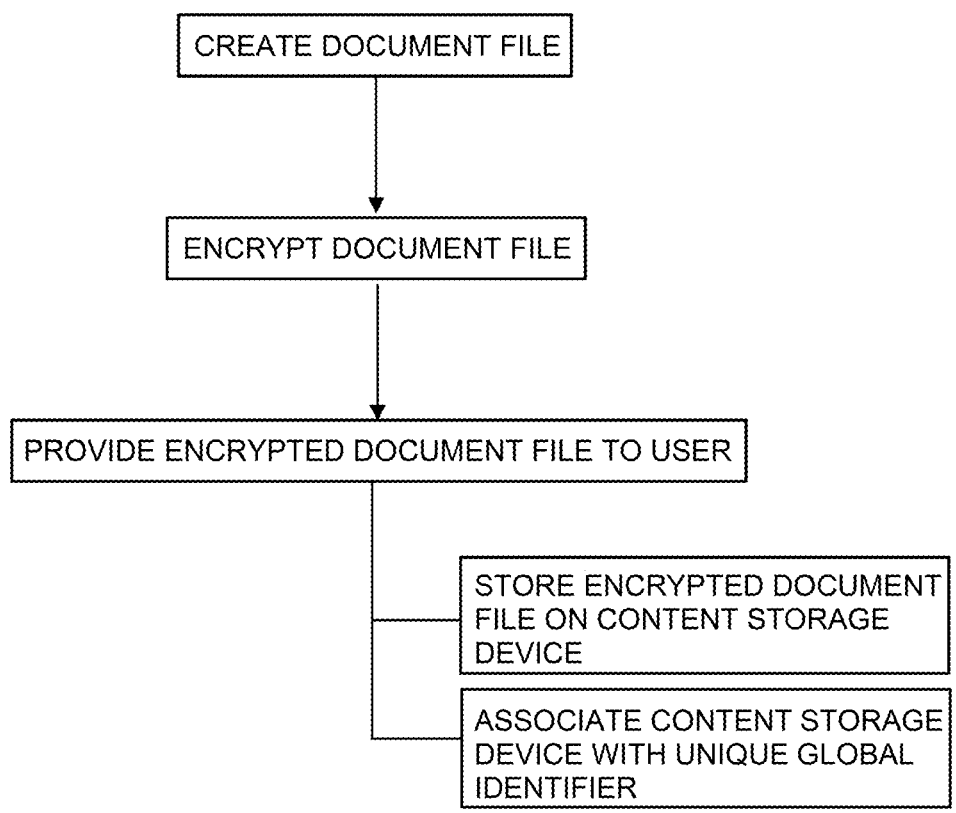
FIGS. 25-30 are flow diagrams showing aspects of exemplary access control provisions according to the invention.

Thus, with reference to FIG. 25, according to the invention a method of controlling access to a document file includes creating the document file, encrypting the document file, and providing the encrypted document file to the user. The document file is a processor-readable file that includes content having at least one media type, presentable to a user on an electronic device having a processor, such as computer, smart phone, or dedicated device. Providing the encrypted document file to the user includes storing the encrypted document file on a content storage device configured to interface for communication with the processor. The content storage device is associated with a unique global identifier and can be arranged either internal to the electronic device or external to the electronic device. Encrypting the document file includes applying an encryption algorithm to the document file to reversibly encipher the document file, that is, producing cyphertext based on the document file that can be used to reproduce the document file. Applying the encryption algorithm to the document file includes providing an encryption key and the unique global identifier and actuating the encryption algorithm with the encryption key and the unique global identifier.

Figure 26:
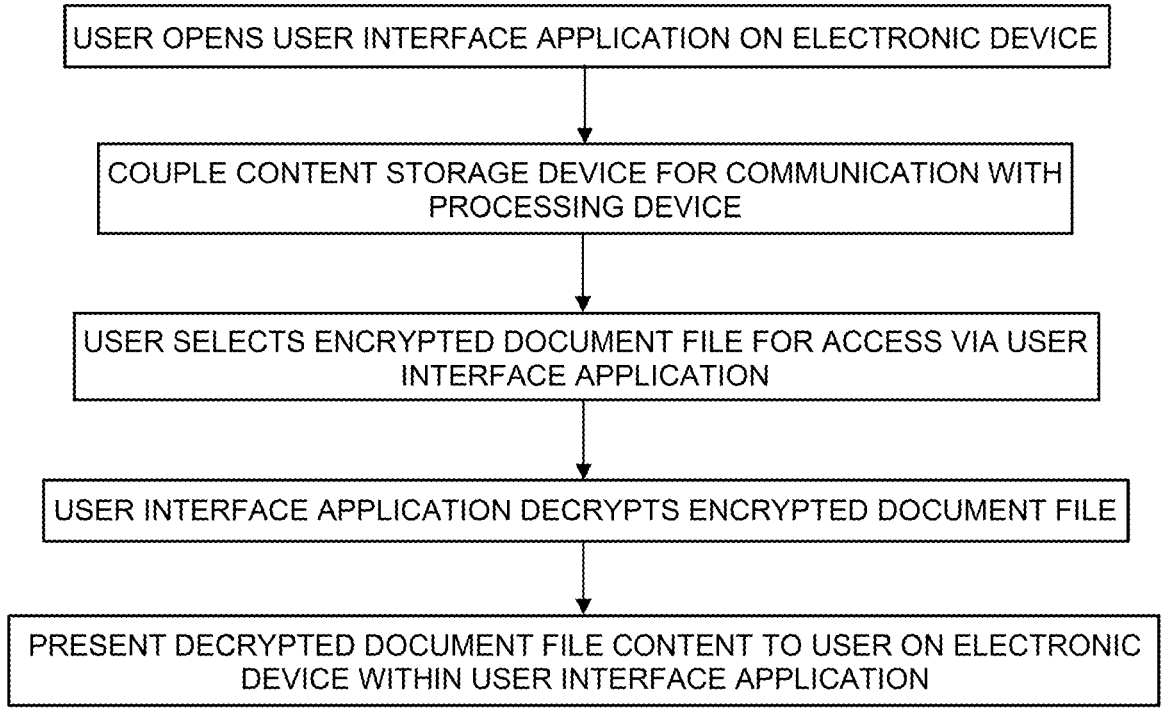

Referring to FIG. 26, to access the document file the user opens a user interface application on the electronic device and couples the content storage device for communication with the processing device. Via the user interface application, the user selects the encrypted document file for access and decrypts the encrypted document file. At least some of the content included in the decrypted document file is then presented to the user on the electronic device, within the user interface application. Decrypting the encrypted document file includes applying a decryption algorithm associated with the encryption algorithm to the encrypted document file to decipher the encrypted document file. Applying the decryption algorithm to the encrypted document file includes providing a decryption key associated with the encryption key, and a user value associated with the unique global identifier, and actuating the decryption algorithm with the decryption key and the user value.

Figure 27:
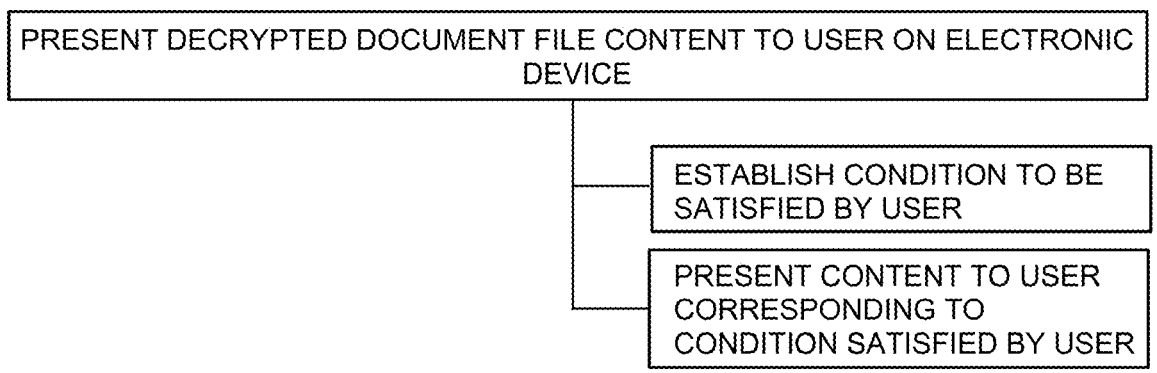

Referring to FIG. 27, presenting at least some of the content included in the decrypted document file to the user on the electronic device includes establishing at least one condition to be satisfied by the user, and presenting an amount of the content to the user corresponding to the at least one condition satisfied by the user. For example, the at least one condition can relate to payment by the user, or to consumption of the content by the user.

Figure 28:
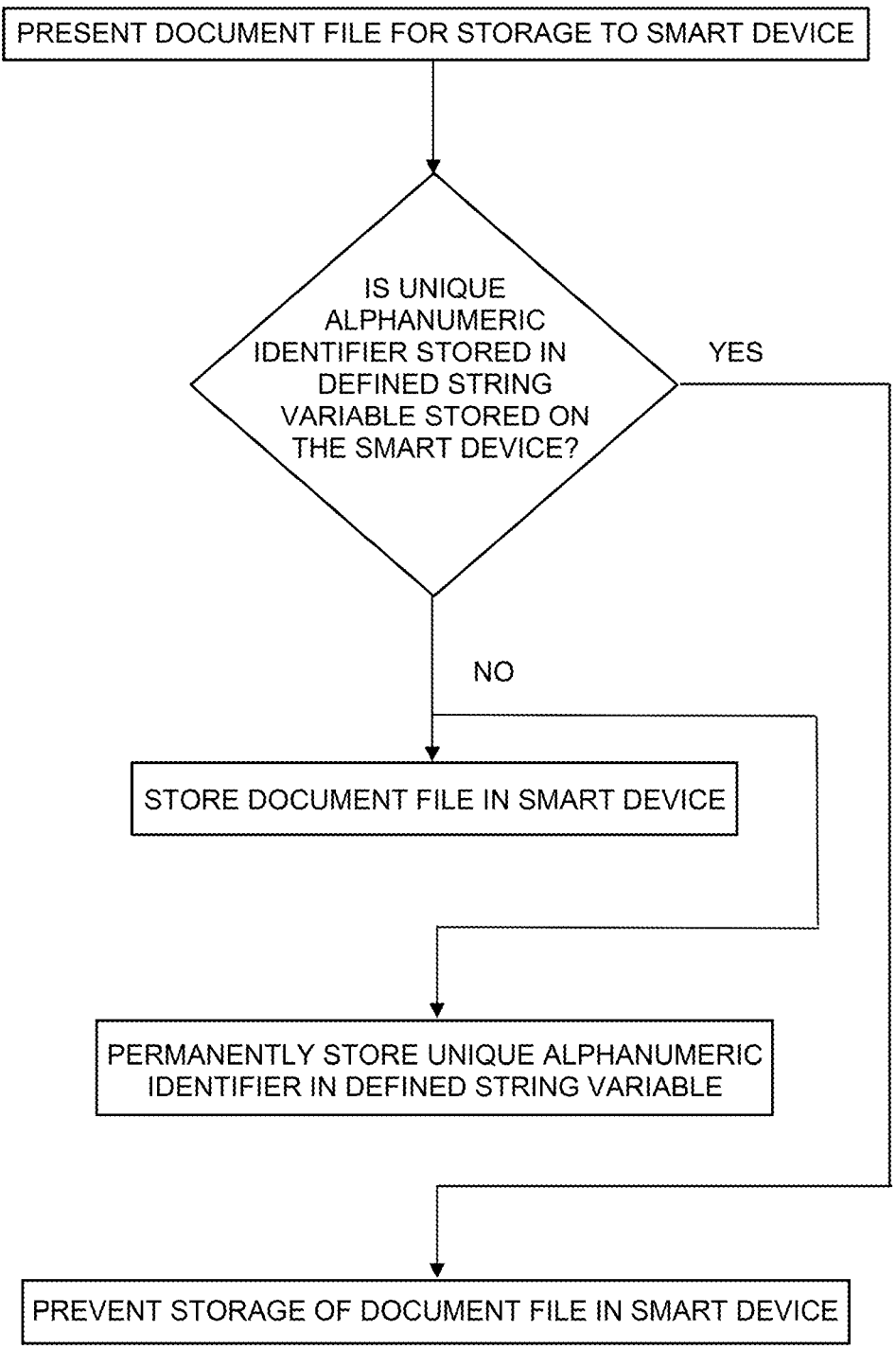

Preferably, the decrypted document file is configured to be opened only within the user interface application, which can be used to control access to the decrypted document file, for example by selectively allowing and preventing, by the user interface application, duplication of the decrypted document file. Referring to FIG. 28, a unique alphanumeric identifier can be assigned to the document file. Further, the content storage device can be a smart device that includes memory and a storage. In this case, the document file can be presented to the smart device for storage, and it can be determined whether the unique alphanumeric identifier is stored in a defined string variable stored on the smart device. The document file is stored in the smart device if the unique alphanumeric identifier is not stored in the defined string variable, and the unique alphanumeric identifier is permanently stored in the defined string variable as the document file is stored to the smart device. Storage of the document file in the smart device is prevented if the unique alphanumeric identifier is stored in the defined string variable.

The unique alphanumeric identifier can be a first unique alphanumeric identifier, in which case allowing duplication of the decrypted document file includes creating a duplicate copy of the document file, and assigning a second unique alphanumeric identifier to the duplicate copy of the document file. The second unique alphanumeric identifier can be, for example, sequentially related to the first unique alphanumeric identifier, and the first and second unique alphanumeric identifiers can be registered as respective file names of the document file and the duplicate copy of the document file.

Figure 29:
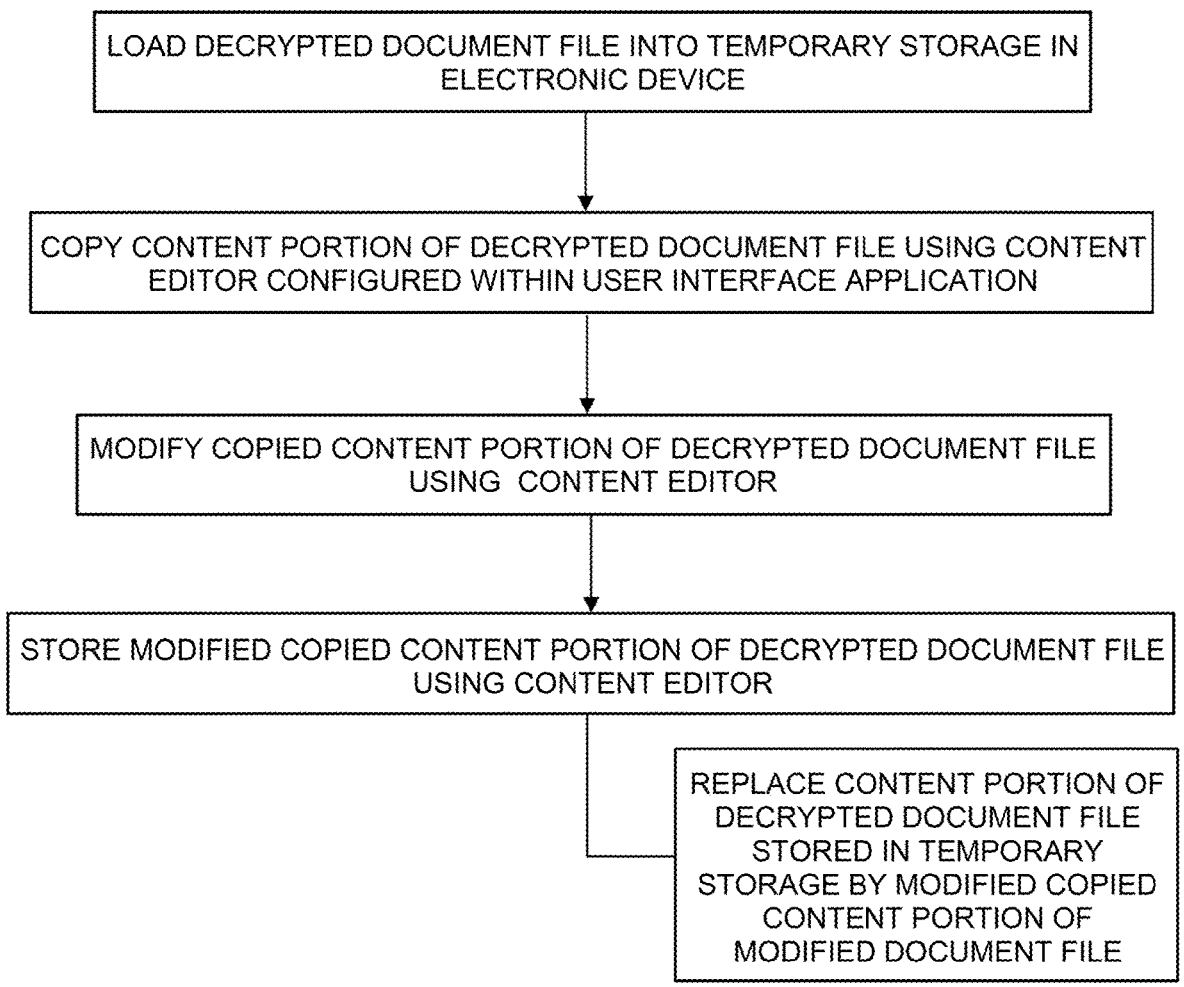

Referring to FIG. 29, controlling access to the decrypted document file by the user interface application can include selectively allowing and preventing, by the user interface application, modification of the decrypted document file by the user. Modification of the decrypted document file by a user can includes loading the decrypted document file into temporary storage in the electronic device, copying a content portion of the decrypted document file using a content editor that is configured within the user interface application, modifying the copied content portion of the decrypted document file using the content editor, and storing the modified copied content portion of the decrypted document file using the content editor by replacing the content portion of the decrypted document file stored in the temporary storage by the modified copied content portion of the modified document file.

Controlling access to the decrypted document file by the user interface application can include preventing, by the user interface application, storage of the modified document file other than on the content storage device having the unique global identifier.

Presenting the decrypted document file to the user on the electronic device can include loading the decrypted document file into temporary storage in the processing device. Controlling access to the decrypted document file by the user interface application can include erasing, by the user interface application, the document file from the content storage device when loading the decrypted document file into temporary storage in the processing device, and erasing, by the user interface application, the document file from the temporary storage when transferring the document file to the content storage device, to ensure the existence of only a single instance of the decrypted document file.

Figure 30:
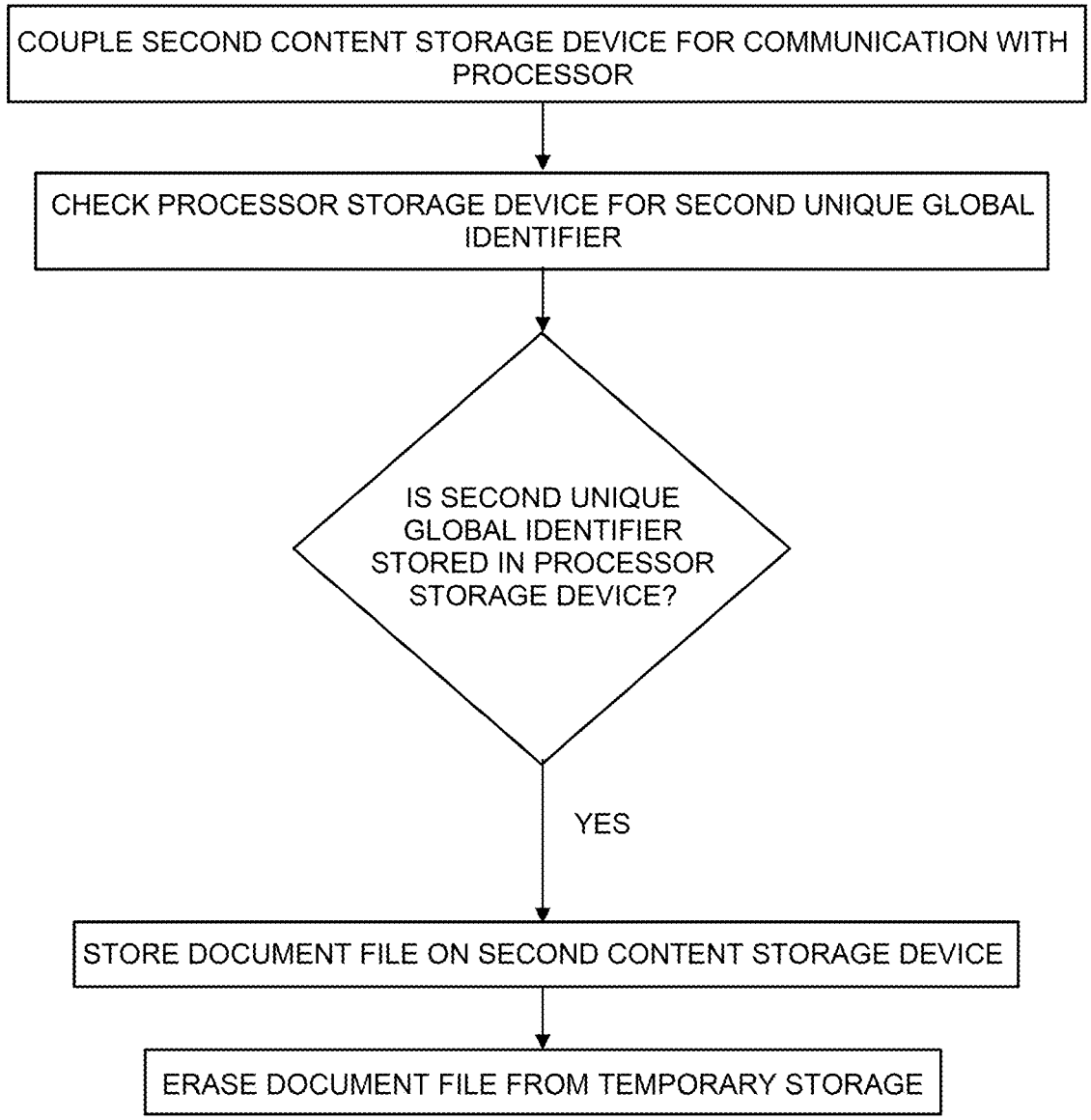

Referring to FIG. 30, the content storage device can be a first content storage device and the unique global identifier can be a first unique global identifier. In this case, a second content storage device, associated with a second unique global identifier, can be coupled for communication with the processor. The processor storage device can be checked for the second unique global identifier, and the document file may be stored on the second content storage device only if the second unique global identifier is stored in the processor storage device. The user interface application can erase the document file from the temporary storage when storing the document file on the second content storage device.

Controlling access to the decrypted document file by the user interface application can include selectively allowing and preventing functions of the user interface application associated with the decrypted document file.

The document file can include an executable file. Providing the encrypted document file to the user can include emailing the executable file to the user. The method can include determining whether the content storage device is coupled for communication with the electronic device, and the executable file may be run on the electronic device within the user interface application only if the content storage device is coupled for communication with the electronic device.

A content management system according to the invention can include system memory storing instructions that, when executed by a processor implement any combination or variation of the methods described above.

Particular exemplary embodiments of the present invention have been described in detail. These exemplary embodiments are illustrative of the inventive concept recited in the appended claims, and are not limiting of the scope or spirit of the invention as contemplated by the inventor.

I claim:

1. A method of controlling access to a document file, comprising:
   creating the document file, wherein the document file is a processor-readable file that includes content having at least one media type, wherein the content is presentable to a user on an electronic device having a processor;
   encrypting the document file; and
   providing the encrypted document file to the user, including making the encrypted document file available to be stored on a content storage device configured to interface for communication with the processor, wherein the content storage device is associated with a unique global identifier and is arranged internal to the electronic device or external to the electronic device;

wherein encrypting the document file includes applying an encryption algorithm to the document file to reversibly encipher the document file; and wherein applying the encryption algorithm to the document file includes providing an encryption key and the unique global identifier and actuating the encryption algorithm with the encryption key and the unique global identifier.

2. The method of claim 1, further comprising:

opening, by the user, a user interface application, on the electronic device;

coupling the content storage device for communication with the processing device;

selecting for access, by the user via the user interface application, the encrypted document file;

decrypting, by the user interface application, the encrypted document file; and presenting at least some of the content included in the decrypted document file to the user on the electronic device, within the user interface application;

wherein decrypting the encrypted document file includes applying a decryption algorithm associated with the encryption algorithm to the encrypted document file to decipher the encrypted document file; and wherein applying the decryption algorithm to the encrypted document file includes providing a decryption key associated with the encryption key, and a user value associated with the unique global identifier, and actuating the decryption algorithm with the decryption key and the user value.

3. A content management system comprising system memory storing instructions that, when executed by a processor implement the method of claim 1.

4. The method of claim 2, presenting at least some of the content included in the decrypted document file to the user on the electronic device includes:

establishing at least one condition to be satisfied by the user; and presenting an amount of the content to the user corresponding to the at least one condition satisfied by the user.

5. The method of claim 2, wherein the decrypted document file is configured to be opened only within the user interface application.

6. The method of claim 2, wherein the document file includes an executable file.

7. The method of claim 4, wherein the at least one condition relates to payment by the user.

8. The method of claim 4, wherein the at least one condition relates to consumption of the content by the user.

9. The method of claim 5, further comprising controlling, by the user interface application, access to the decrypted document file.

10. The method of claim 9, wherein controlling, by the user interface application, access to the decrypted document file includes selectively allowing and preventing, by the user interface application, duplication of the decrypted document file.

11. The method of claim 9, wherein controlling, by the user interface application, access to the decrypted document file includes selectively allowing and preventing, by the user interface application, modification of the decrypted document file by the user.

12. The method of claim 9, wherein controlling, by the user interface application, access to the decrypted document file includes preventing, by the user interface application, storage of the modified document file other than on the content storage device having the unique global identifier.

13. The method of claim 9, wherein:

presenting the decrypted document file to the user on the electronic device includes loading the decrypted document file into temporary storage in the processing device; and controlling, by the user interface application, access to the decrypted document file includes:

erasing, by the user interface application, the document file from the content storage device when loading the decrypted document file into temporary storage in the processing device, and erasing, by the user interface application, the document file from the temporary storage when transferring the document file to the content storage device.

14. The method of claim 9, wherein controlling, by the user interface application, access to the decrypted document file includes selectively allowing and preventing functions of the user interface application associated with the decrypted document file.

15. The method of claim 11, wherein modification of the decrypted document file by a user includes:

loading the decrypted document file into temporary storage in the electronic device;

copying a content portion of the decrypted document file using a content editor that is configured within the user interface application;

modifying the copied content portion of the decrypted document file using the content editor; and storing the modified copied content portion of the decrypted document file using the content editor by replacing the content portion of the decrypted document file stored in the temporary storage by the modified copied content portion of the modified document file.

16. The method of claim 6, wherein providing the encrypted document file to the user includes emailing the executable file to the user as an email attachment.

17. The method of claim 6, further comprising:

determining whether the content storage device is coupled for communication with the electronic device; and running the executable file on the electronic device, within the user interface application, only if the content storage device is coupled for communication with the electronic device.

18. The method of claim 6, further comprising:

assigning a binary-valued variable to the executable file;

setting the binary-valued variable to a first value when the executable file is first provided to the user;

setting the binary-valued variable to a second value when the executable file is copied to a storage device other than the content storage device associated with the unique global identifier, wherein the other storage device is one of temporary storage internal to the electronic device and a second content storage device; and controlling copying of the executable file by:

checking the value of the binary-valued variable;

allowing copying if the value of the binary-valued variable is the first value; and prohibiting copying if the value of the binary-valued variable is the second value.

19. The method of claim 16, further comprising:
assigning a unique alphanumeric identifier to the document file; and
assigning the unique alphanumeric identifier to the email attachment.

20. The method of claim 18, wherein the other storage device is associated with a second unique global identifier, the method further comprising:
copying the executable file to the other storage device;
renaming the copied executable file to a file name such that the file name corresponds with the second unique global identifier in a predetermined manner;
assigning a binary-valued variable to the executable file stored in the other storage device; and
setting the binary-value variable to the first value.

21. The method of claim 18, further comprising opening by the user the document file in the user interface application.

22. The method of claim 18, further comprising:
closing, by the user, the user interface application, thereby erasing the executable file from temporary storage; and
in response to the closing of the user interface application, setting the binary-valued variable to the first value.

23. The method of claim 18, further comprising:
paying, by the user, a fee associated with access to the document file while the content storage device is coupled for communication with the processing device; and
in response to the paying the fee by the user, re-setting the binary-valued variable to the first value.

* * * * *